(12) United States Patent
Grocutt

(10) Patent No.: US 9,116,711 B2
(45) Date of Patent: Aug. 25, 2015

(54) EXCEPTION HANDLING IN A DATA PROCESSING APPARATUS HAVING A SECURE DOMAIN AND A LESS SECURE DOMAIN

(71) Applicant: ARM LIMITED, Cambridge (GB)

(72) Inventor: Thomas Christopher Grocutt, Impington (GB)

(73) Assignee: ARM Limited, Cambridge (GB)

( * ) Notice: Subject to any disclaimer, the term of this patent is extended or adjusted under 35 U.S.C. 154(b) by 252 days.

(21) Appl. No.: 13/680,298

(22) Filed: Nov. 19, 2012

(65) Prior Publication Data

US 2013/0205125 A1 Aug. 8, 2013

Related U.S. Application Data

(63) Continuation-in-part of application No. 13/368,419, filed on Feb. 8, 2012.

(30) Foreign Application Priority Data

Oct. 1, 2012 (GB) .................................. 1217531.1

(51) Int. Cl.
*G06F 21/00* (2013.01)
*G06F 9/38* (2006.01)
(Continued)

(52) U.S. Cl.
CPC ............ *G06F 9/3861* (2013.01); *G06F 9/3013* (2013.01); *G06F 9/30123* (2013.01);
(Continued)

(58) Field of Classification Search
CPC ... G06F 21/74; G06F 9/30101; G06F 9/3009; G06F 12/1491; G06F 2209/481

USPC .......................................................... 727/27
See application file for complete search history.

(56) References Cited

U.S. PATENT DOCUMENTS 4,177,514 A 12/1979 Rupp
4,488,227 A 12/1984 Miu et al.
(Continued)

FOREIGN PATENT DOCUMENTS

EP 1 331 539 7/2003
GB 2448149 10/2008
(Continued)

OTHER PUBLICATIONS

ARM Limited, Cortex-M3 Technical Reference Manual, r1p1, 2006, ARM Limited; cover, p. ii and Chapters 5 and 8; from applicants IDS.*

(Continued)

*Primary Examiner* — Carl Colin
*Assistant Examiner* — Gary Lavelle
(74) *Attorney, Agent, or Firm* — Nixon & Vanderhye P.C.

(57) ABSTRACT

Processing circuitry can operate in a secure domain and a less secure domain. In response to an initial exception from background processing performed by the processing circuitry, state saving of data from a first subset of registers is performed by exception control circuitry before triggering an exception handling routine, while the exception handling routine has responsibility for performing state saving of data from a second subset of registers. In response to a first exception causing a transition from the secure domain from a less secure domain, where the background processing was in the less secure domain, the exception control circuitry performs additional state saving of data from the second set of registers before triggering the exception handling routine. In response to a tail-chained exception causing a transition from the secure domain to the less secure domain, the exception handling routine is triggered without performing an additional state saving.

24 Claims, 16 Drawing Sheets

(51) Int. Cl.
*G06F 9/46* (2006.01)
*G06F 9/48* (2006.01)
*G06F 21/52* (2013.01)
G06F 12/14 (2006.01)
G06F 9/30 (2006.01)
G06F 21/74 (2013.01)

(52) U.S. Cl.
CPC .............. *G06F9/461* (2013.01); *G06F 9/4812* (2013.01); *G06F 21/52* (2013.01); G06F 9/3009 (2013.01); G06F 9/30101 (2013.01); G06F 12/1491 (2013.01); G06F 21/74 (2013.01); G06F 2209/481 (2013.01)

(56) References Cited

U.S. PATENT DOCUMENTS

| | | | |
|---|---|---|---|
| 4,519,032 A | | 5/1985 | Mendell |
| 5,590,332 A | * | 12/1996 | Baker ........................... 717/151 |
| 5,812,850 A | * | 9/1998 | Wimble ........................ 717/131 |
| 6,363,474 B1 | * | 3/2002 | McCulley et al. ............. 712/202 |
| 6,993,663 B1 | | 1/2006 | Paya et al. |
| 7,120,794 B2 | | 10/2006 | Kelley et al. |
| 7,966,466 B2 | | 6/2011 | Kershaw et al. |
| 7,984,257 B2 | | 7/2011 | Funk et al. |
| 2002/0099933 A1 | | 7/2002 | Nevill et al. |
| 2004/0003377 A1 | | 1/2004 | Di Loreto |
| 2004/0139346 A1 | * | 7/2004 | Watt et al. .................... 713/200 |
| 2004/0168047 A1 | | 8/2004 | Fukai et al. |
| 2005/0044292 A1 | | 2/2005 | McKeen |
| 2005/0177666 A1 | * | 8/2005 | Kimelman et al. ........... 710/200 |
| 2006/0224866 A1 | * | 10/2006 | Grisenthwaite et al. ...... 712/226 |
| 2007/0204259 A1 | | 8/2007 | Wilner et al. |
| 2008/0216175 A1 | | 9/2008 | Pike |
| 2008/0250216 A1 | | 10/2008 | Kershaw et al. |
| 2008/0250217 A1 | | 10/2008 | Kershaw et al. |
| 2010/0031360 A1 | | 2/2010 | Seshadri et al. |
| 2010/0057960 A1 | * | 3/2010 | Renno ........................... 710/110 |
| 2010/0325397 A1 | | 12/2010 | Craske et al. |
| 2011/0225402 A1 | | 9/2011 | Grisenthwaite |
| 2012/0036341 A1 | * | 2/2012 | Morfey et al. ................ 712/229 |
| 2012/0042154 A1 | | 2/2012 | Grisenthwaite |

FOREIGN PATENT DOCUMENTS

| | | |
|---|---|---|
| GB | 2482701 | 2/2012 |
| JP | 09091154 A | 4/1997 |
| WO | WO 2007/089373 | 8/2007 |

OTHER PUBLICATIONS

Cocke et al., Scheme to Improve the Call/Return Performance on the RS/6000, Jul. 1, 1993, IBM, pp. 143-145.*

International Search Report and Written Opinion of the International Searching Authority dated May 7, 2013 in PCT/GB2013/050102.
U.S. Appl. No. 13/680,352, filed Nov. 19, 2012, Grocutt et al.
U.S. Appl. No. 13/735,350, filed Jan. 7, 2013, Grocutt et al.
U.S. Appl. No. 13/741,709, filed Jan. 15, 2013, Grocutt et al.
GB Search Report dated Aug. 14, 2013 in GB 1220769.2.
International Search Report and Written Opinion of the International Searching Authority mailed Sep. 20, 2013 in PCT/GB2013/052105.
International Search Report and Written Opinion of the International Searching Authority mailed Oct. 7, 2013 in PCT/GB2013/052107.
International Search Report and Written Opinion of the International Searching Authority mailed Sep. 27, 2013 in PCT/GB2013/052108.
ARM Limited, "Cortex—M3 Technical Reference Manual" Revision: r1p1, 2005, 42 pages.
International Preliminary Report on Patentability dated Aug. 21, 2014 in PCT/GB2013/050029, 6 pages.
Office Action mailed Dec. 2, 2014 in co-pending U.S. Appl. No. 13/368,419, 74 pages.
Office Action mailed Dec. 26, 2014 in co-pending U.S. Appl. No. 13/680,352, 38 pages.
Office Action mailed Feb. 13, 2015 in co-pending U.S. Appl. No. 13/735,350, 59 pages.
Office Action mailed Dec. 12, 2014 in co-pending U.S. Appl. No. 13/741,709, 48 pages.
ARM Limited, Cortex-M3, Revision: r1p1, Technical Reference Manual, 2006, ARM Limited, downloaded from http://infocenter.arm.com/help/topic/com.arm.doc.ddi0337e/DDI0337E_cortex_m3_r1p1_trm.pdf on Oct. 2, 2014, pp. 1-22, 2, 3, 5-2, 5-9, 5-10, 5-11 and 5-22 (384 pages).
ARM Limited, ARM Procedure Call Standard for the ARM Architecture, Oct. 16, 2009, release 2.08, downloaded from https://web.eecs.umich.edu/~prabal/teaching/eecs373-f11/readings/ARM-AAPCS-EABI-v2.08.pdf on Dec. 14, 2014, 34 pages.
ARM Limited, Corex—M3Technical Reference Manual, Jun. 13, 2007, ARM Limited, Revision r1p1, Chapters 5, 10 and 11, downloaded from http://infocenter.arm.com/help/topic/com.arm.doc.ddi0337e/DDI0337E_cortex_m3_r1p1_trm.pdf, 97 pages.
ARM Limited, ARM® v7-M Architecture Reference Manual, Feb. 2010, ARM Limited, C_errata_v3, https://web.eecs.umich.edu/~prabal/teaching/eecs373-f10/readings/ARMv7-M_ARM.pdf on Dec. 16, 2014, 716 pages.
Micromint USA, Eagle interrupts Example, Jun. 20, 2010, micromint.com, downloaded from http://wiki.micromint.com/index.php/Eagle_interrupts_Example on Nov. 12, 2014, pp. 1-2.
U.S. Appl. No. 13/368,419, filed Feb. 8, 2012, Grocutt et al.
Office Action mailed Jun. 22, 2015 in co-pending U.S. Appl. No. 13/368,419 79 pages.
International Preliminary Report on Patentability dated Apr. 16, 2015 in PCT/GB2013/052105, 5 pages.
International Preliminary Report on Patentability dated Apr. 16, 2015 in PCT/GB2013/052108, 6 pages.

* cited by examiner

ATTACK SCENARIOS

Initialise Secure Stack

SCRS - 0 - stacking callee registers can be skipped on switching
           from secure → less secure
       1 - perform stacking of callee registers on switching
           from secure → less secure S -    0 - background processing was in less secure domain
       1 - background processing was in secure domain

EXCEPTION HANDLING IN A DATA PROCESSING APPARATUS HAVING A SECURE DOMAIN AND A LESS SECURE DOMAIN

CROSS-REFERENCE

This application is a continuation-in-part of U.S. application Ser. No. 13/368,419 filed Feb. 8, 2012, and claims priority to UK patent application number 1217531.1 filed 1 Oct. 2012, the entire contents of each of which are hereby incorporated by reference.

BACKGROUND TO THE INVENTION

1. Technical Field

The present invention relates to the field of data processing and in particular to a data processing having a secure domain and a less secure domain.

2. Background

Many data processing systems and architectures provide ways of isolating and protecting sensitive data and sections of code from access by unauthorised persons or processes. Although it is important to be able to provide security, there is an overhead in performance and circuit area associated with this protection.

In small systems such as microcontrollers, it is very important that these overheads are kept low and thus, some compromise between level of security and performance may need to be made.

One way of keeping data and code secure is provided by ARM® of Cambridge UK, with their Trustzone architecture where there are secure and non-secure states and a software handler is used to transition between the states, the software handler protecting the security of the secure side. Although this approach provides a high degree of security, considerable software intervention in the form of the software handler is required to change security states which both reduces the performance of the system and increases the amount of effort required to develop an external application program interface API for the secure software as all calls must be proxied through the software hander. Similarly exceptions that occur whilst in the secure domain that require handling in the non-secure domain also need to be proxied through a secure exception handler, this allowing the secure state to be protected before control passes to the non-secure exception handler.

SUMMARY OF THE INVENTION

Viewed from a first aspect, the present invention provides a data processing apparatus comprising:

processing circuitry for performing data processing operations in response to program code, the processing circuitry comprising exception control circuitry for controlling exception processing;

a plurality of registers for storing data, the registers including a first subset of registers and a second subset of registers; and a data store for storing data, the data store comprising a plurality of regions including a secure region and a less secure region, wherein the secure region is for storing data which is accessible by the processing circuitry when operating in a secure domain and not accessible by the processing circuitry when operating in a less secure domain; wherein:

in response to an initial exception from background processing performed by the processing circuitry, the exception control circuitry is configured to perform state saving of data from the first subset of registers before triggering the processing circuitry to perform an exception handling routine corresponding to the exception, wherein the exception handling routine has responsibility for performing state saving of data from the second subset of registers;

in response to a first exception causing a transition from the secure domain to the less secure domain, where the background processing was performed by the processing circuitry in the secure domain, the exception control circuitry is configured to perform additional state saving of the data from the second subset of registers before triggering the processing circuitry to perform the exception handling routine in the less secure domain; and in response to a tail-chained exception causing a transition from the secure domain to the less secure domain, the exception control circuitry is configured to trigger the processing circuitry to perform the exception handling routine without performing the additional state saving, the tail-chained exception being processed after said first exception has been processed and before returning to the background processing.

When an exception occurs during background processing, the background processing may have placed data values in registers and so to allow these data values to be retained and restored when the exception is finished, the system may perform state saving of the data from the registers to the data store. As discussed above, for some systems it is important to achieve a compromise between the level of security achieved and the processing performance. This is also true when performing the state saving in response to an exception.

For performance reasons, it can be useful to perform the state saving of the data in the registers in a first subset and a second subset. State saving of data from the first subset can be performed by exception control circuitry in hardware before triggering the exception handling routine. In contrast, the exception handling routine (i.e. software) may have responsibility for performing state saving of data from a second subset of registers.

However, from a security point of view, the state saving of the second subset of registers under control of the exception handling routine could sometimes be problematic. If an exception causes a transition from a secure domain to a less secure domain, following background processing performed in the secure domain, then the less secure exception handling routine could gain access to secure data placed in the second subset of registers by the secure background code.

To prevent this security breach, if a first exception occurs that causes a transition from the secure domain to the less secure domain where background processing was in the secure domain, then the exception control circuitry performs additional state saving of data from the second subset of registers, before triggering the exception handling routine in the less secure domain. By providing a mechanism for saving the state of the second subset of registers in hardware, it is not essential for the less secure exception handling software to perform the state saving of the second subset of registers, which could contain secure data.

However, performing the additional state saving in hardware causes a longer delay before starting the exception handling routine. It is possible for another exception to be pending at the time when an earlier exception has completed. In this case, the processing circuitry may service the other exception before returning to the background processing which was being performed before the earlier exception. This situation is referred to as "tail-chaining" and the other exception is referred to as a "tail-chained" exception. To reduce the performance impact of the additional state saving, where the background processing is in the secure domain, the additional state saving is performed for the first exception causing a transition from the secure domain to the less secure domain. For a subsequent tail-chained exception causing a transition from the secure domain to the less secure domain, it is not necessary to repeat the additional state saving as the data values required by the background processing were already saved in response to the first exception. Therefore, in many situations it is possible to trigger the exception handling routine for the tail-chained exception without performing the additional state saving.

Hence, the present technique can achieve an improved balance between security and performance when performing state saving in response to exceptions. The hardware mechanism of the present invention enables effective handling of less secure exceptions without requiring proxying through a secure exception handler.

In response to the first exception causing the transition from the secure domain to the less secure domain, the exception control circuitry may clear the first subset of registers and second subset registers before triggering the processing circuitry to perform the exception handling routine. This means that the exception handling routine in the less secure domain cannot access any data placed in the registers while in the secure domain.

Further, in one embodiment, in response to said first exception, the data processing apparatus may be configured to ensure that the first subset of registers does not contain secure data, before the exception control circuitry triggers the processing circuitry to perform the exception handling routine. There are a number of ways in which this can be achieved. For example, either the hardware or software may ensure that the first subset of registers is cleared so that those registers do not contain any secure data. Alternatively, it may be the case that the first subset of registers can be engineered so as only to include non-secure data prior to the processing circuitry being triggered to perform the exception handling routine, in which case it may not be necessary to clear the first subset of registers.

In the present application, the terms "caller registers" and "callee registers" may be used to indicate the first subset and second subset of registers respectively.

While the exception handling routine has responsibility for performing state saving of the data from the second subset of registers (the callee registers), it may not be essential for the exception handling routine to actually perform the state saving of the data from the second subset. For example, if the exception control circuitry has already performed the additional state saving of the second subset registers, then the exception handling routine could omit the state saving of these registers.

Alternatively, it may be simpler for the exception handling routine to always perform the state saving of the data from the callee registers, even if the additional state saving has already been carried out by the hardware. As the registers may already be cleared by the hardware, the exception handling routine may not have access to the data values in the callee registers anyway, and the overhead associated with the software saving the cleared data values to the data store and restoring the cleared data values later on may be less than the overhead incurred by a mechanism for enabling the exception handling routine to detect whether the hardware has already performed the additional state saving.

Regarding the first subset of registers (caller registers) and the second subset registers (callee registers), it is possible for the first subset of registers to comprise zero registers so that all of the registers are in the second subset. In this case, for most exceptions no state saving would be performed by the exception control circuitry, with the exception handling routine having responsibility for saving all the registers in the second subset. However, in response to the first exception causing a transition from the second secure domain to the less secure domain, the additional state saving may save the second subset (all the registers) in hardware using the exception control circuitry, to prevent access to this data by the exception handling routine in a less secure domain.

The first exception which triggers the additional state saving may be an initial exception which occurs while the processing is performing background processing. Alternatively, the first exception may itself be a tail-chained exception which is processed after an initial exception but before returning to the background processing.

In the present application, the term "background processing" is used to indicate the processing which was interrupted by an exception of a higher priority. If an exception handling routine is itself interrupted by a higher priority exception, then the exception handling routine that was interrupted may become the "background processing" for the pre-empting exception, and the pre-empting exception will then trigger the state saving of data being used by the exception handling routine prior to being interrupted.

In response to a tail-chained exception causing a transition from a less secure domain to a secure domain, the exception control circuitry may control the processing circuitry to trigger the exception handling routine without restoring the data saved in the additional state saving to the second subset of registers. In the absence of the present technique, it would be expected that the data of the second subset of registers should be restored at this point because the data in these registers would be expected to be visible to an exception in the secure domain. However, the present technique recognizes that this restoring operation is not essential. By omitting the restoring, the second subset of registers will still be saved when a further tail-chained exception occurs transitioning from the secure domain to the less secure domain, allowing the additional state saving to be omitted for this further tail-chained exception. This improves performance in most cases because the tail-chained exceptions can be handled more quickly without the delay caused by saving or restoring data to the registers.

On entry to a new exception causing a transition from the secure domain to the less secure domain, the exception control circuitry may use a state saving status value to determine whether to perform the additional state saving before triggering the exception handling routine. The state saving status value can indicate whether the additional state saving needs to be performed before processing a tail chained exception in the less secure domain. Whether the additional state saving is necessary is dependent on the past history of exception processing, and so the state saving status value enables an aspect of this history to be recorded to allow the system to determine whether additional state saving needs to be performed again.

In one example, the state saving status value may indicate whether at least one exception has been processed in the less secure domain between halting the background processing and entering the new exception, which gives an indication of whether the additional state saving will be necessary on the next tail-chained transition from a secure exception to a less secure exception.

On entry to the new exception, the additional state saving may be performed if
(a) the background processing was performed in the secure domain; AND
(b) the state saving status value indicates that no exceptions have been processed in the less secure domain between halting the background processing and entering the new exception.

In other cases, the additional state saving will not be necessary. If the background processing was not in the secure domain, the background processing will not have placed any secure data in the registers, and so there is no need for the additional state saving to protect data from the less secure domain. Also, even if the background processing was in the secure domain, if an exception has already been processed in the less secure domain between halting the background processing in the secure domain and entering the new exception, then that exception will have triggered the additional state saving and so it is not needed again.

A security domain value may be maintained to indicate whether the background processing was performed in the secure domain or less secure domain. Hence, based on the security domain value and the state saving status value, the exception control circuitry can determine whether or not it needs to perform the additional data saving on entering the new exception.

As mentioned above, the state saving status value can provide some information about the past history of exception processing (e.g. which domain an exception was processed in). However, this could allow some information about the past exceptions to be inferred in the less secure domain, which could lead to a security breach. For example, this could allow less secure code to infer that certain secure data has been processed recently. Therefore, it may be desirable to make the state saving status inaccessible during the processing in the less secure domain.

One way of doing this is to set the state saving status value to a fixed value when entering the less secure domain and to set the state saving status value to a variable value when entering the secure domain. The variable value is only necessary when in the secure domain, since when in the less secure domain then the secure-to-less-secure state transition for which the value is useful will not occur. Therefore, by setting this value to a fixed value on entry to the less secure domain, the processing performed in the less secure domain cannot gain any information about the secure domain from the state saving status value.

Another potential security issue that arises with the state saving status value is the possibility that code in the less secure domain could modify the value of the state saving status value, thus influencing whether state saving is performed on the transition from the secure domain to the less secure domain. If a hacker can gain control of whether the state saving is performed, this could lead to a leak of secure data. There are several ways of preventing this problem.

In one example, when returning from an exception in the less secure domain, the exception control circuitry may check whether the state saving status value still has the fixed value to which it was set when entering the less secure domain, and an error may be triggered if the state saving status value does not have the fixed value. Since the state saving status value is supposed to have the fixed value while in the less secure domain, then any other value can indicate that tampering has occurred and so a fault can be triggered.

Alternatively, the state saving status value may have a variable value during the processing in the less secure domain. This may be suitable if it is not a problem from a security point of view to allow the exception in the less secure domain to access the state saving status value with a variable value. However, to prevent changes to the state saving status value by code in the less secure domain influencing subsequent state saving operations, when returning from an exception in the less secure domain the exception control circuitry may control exception processing independently of the state saving status value. By ignoring the state saving status value and performing the same processing regardless of whether the state saving status value has one value or another when exiting the less secure exception, any tampering with the state saving status value by code in the less secure domain will not have an effect on the security of the system.

For example, after leaving a less secure exception handler, the state saving status value could be reset to the value which it is supposed to have in the less secure domain, to override any changes to the status value while operating in the less secure domain. This means that the subsequent processing is independent of the value which the state saving status value has when returning from the less secure exception.

In another example, the state saving status value may indicate whether the most recent transition between domains when switching between tail-chained exceptions was from the domain to the secure domain. This can be combined with the security domain value indicating whether the background processing was performed in the secure domain to determine whether additional state saving is necessary. The advantage of this scheme is that the state saving status value will have a fixed value in the less secure domain and a variable value in the secure domain (depending on whether there was an earlier transition from less secure domain to the secure domain).

For example, the state saving status value may be initialized to a first value when handling an initial exception following background processing. If the background processing was in the secure domain, then on entering a tail-chained exception, the state saving status value may be set to a second value if the tail-chained exception is in the secure domain and follows a previous exception in the less secure domain. On entering an exception in the less secure domain, the state saving status value may be set to the first value. When entering a tail-chained exception which causes a transition from the secure domain from the less secure domain, then the additional state saving may be performed if the statue saving status value has the first value. In this way, the additional state saving can be performed when necessary, and omitted when it is has already been performed or is unnecessary, and the state saving status value may be controlled to have a fixed value (the first value) while the processing is in the less secure domain.

One issue which arises is how to allow the state saving status value to be maintained when transitioning between different exceptions. The state saving status value could be placed in memory, but it would be relatively slow to access the value when required. The state saving status value could also be placed in a register, but then it would be likely to be saved and possibly cleared when switching from one exception to another.

One useful way of representing the state saving status value is in part of an exception return value stored in a link register. The exception return value stored in the link register is used for controlling return from the exception handling routine.

On entry to an exception, the exception control circuitry may set the link register to a dummy exception return address which does not correspond to a valid instruction address. The exception handling routine may include a branch to the address that was stored in the link register. In response to the branch to the dummy exception return address, the exception control circuitry can detect that the branch is an exception return rather than another type of return (e.g. a function return), and may detect that it has to perform the state restoring processing for restoring data previously saved in the state saving, before returning to the background processing. The use of a dummy exception return address instead of a valid instruction address enables the same branch and link mechanism to be used for exception returns as for other types of return (e.g. a function return).

A useful property is that the link register is set afresh to the exception return value on entry to each exception (with tail-chained exceptions the exception return address would previously have been set to the same value as for the previous exception). The present technique uses this refreshing of the exception return value to pass information from exception to exception about the past history of the exception handling. By indicating the state saving status value as part of the exception return value, and changing the state saving status value when a new exception return value is stored to the link register, information can be passed between exceptions, and set to different values, to allow a determination of whether additional state saving is required. This is quite different from conventional techniques which use the same exception return value for each tail-chained exception.

The state saving status value may also be useful in the case of a pre-emption of an exception. If an exception of a higher priority than a current exception occurs then the current processing can be halted and the higher priority exception can be processed instead. This is known as pre-emption.

However, if pre-emption occurs while performing the state saving, then whether or not the state saving is completed can affect the performance of the pre-empting exception. If the state saving of the first subset of registers has not yet completed, and it is not necessary for additional state saving to be performed ahead of the pre-empting exception, then it can be quickest to omit the additional state saving even if it was necessary for the exception which originally triggered the state saving.

On the other hand, if a pre-empting exception occurs while performing the additional state saving of the second subset of registers, then it may be most efficient to complete the additional state saving even if this is not necessary for the pre-empting exception, since halting and reversing the additional state saving which has already been performed could take more time. Hence, even if there are no further less secure exceptions which would cause a security breach if the additional state saving is not performed, it may still be more efficient from a performance point of view to complete the additional state saving.

To indicate to subsequent exceptions that the additional state saving has been performed, the state saving status value may be set in this case of the pre-emption. In response to a further tail-chained exception which switches from a secure to a less secure domain, which is performed after the pre-empting exception, the additional state saving can be omitted if the state saving status value indicates that it has already been performed.

The state saving may store the data to various locations. It is possible to store the contents of the registers to a general region of the data store. However, in this case it would be necessary to retain an indication of where in the data store the register contents have been saved. Therefore, a simpler way of performing the state saving is to use a stack within the data store. When using a stack the location of the data stored to the stack is retained in the form of a stack pointer in one of the registers, allowing quick and easy access to the data when it needs to be restored.

In the context of a secure system having a secure domain and a less secure domain, there may be a secure stack and a less secure stack. In the state saving of the first subset of registers and the additional state saving of the second subset of registers, the exception control circuitry may save the data to the one of the secure stack and less secure stack corresponding to the current domain in which the processing circuitry was operating when the background processing was halted to perform the initial exception. The initial exception may be said first exception which triggered additional state saving or may be an earlier exception.

While the present application in general refers to a less secure domain and a secure domain it is possible for there to be multiple secure domains with different security degrees or the same security degree, or multiple less secure domains with the same or different security conditions.

Viewed from a further aspect, the present invention provides a data processing apparatus comprising:

processing means for performing data processing operations in response to program code, the processing means comprising exception control means for controlling exception processing;

a plurality of register means for storing data, the register means including a first subset of register means and a second subset of register means; and data storing means for storing data, the data storing means comprising a plurality of regions including a secure region and a less secure region, wherein the secure region is for storing data which is accessible by the processing means when operating in a secure domain and not accessible by the processing means when operating in a less secure domain; wherein:

in response to an initial exception from background processing performed by the processing means, the exception control means is configured to perform state saving of data from the first subset of register means before triggering the processing means to perform an exception handling routine corresponding to the exception, wherein the exception handling routine has responsibility for performing state saving of data from the second subset of register means;

in response to a first exception causing a transition from the secure domain to the less secure domain, where the background processing was performed by the processing means in the secure domain, the exception control means is configured to perform additional state saving of the data from the second subset of register means before triggering the processing means to perform the exception handling routine in the less secure domain; and in response to a tail-chained exception causing a transition from the secure domain to the less secure domain, the exception control means is configured to trigger the processing means to perform the exception handling routine without performing the additional state saving, the tail-chained exception being processed after said first exception has been processed and before returning to the background processing.

Viewed from another aspect the present invention provides a data processing method for a data processing apparatus comprising processing circuitry for performing data processing operations in response to program code, the processing circuitry comprising exception control circuitry for controlling exception processing; a plurality of registers for storing data, the registers including a first subset of registers and a second subset of registers; and a data store for storing data, the data store comprising a plurality of regions including a secure region and a less secure region, wherein the secure region is for storing data which is accessible by the processing circuitry when operating in a secure domain and not accessible by the processing circuitry when operating in a less secure domain;

the method comprising the steps of:

in response to an initial exception from background processing performed by the processing circuitry, the exception control circuitry performing state saving of data from the first subset of registers before triggering the processing circuitry to perform an exception handling routine corresponding to the exception, wherein the exception handling routine has responsibility for performing state saving of data from the second subset of registers;

in response to a first exception causing a transition from the secure domain to the less secure domain, where the background processing was performed by the processing circuitry in the secure domain, the exception control circuitry performing additional state saving of the data from the second subset of registers before triggering the processing circuitry to perform the exception handling routine in the less secure domain; and in response to a tail-chained exception causing a transition from the secure domain to the less secure domain, the exception control circuitry triggering the processing circuitry to perform the exception handling routine without performing the additional state saving, the tail-chained exception being processed after said first exception has been processed and before returning to the background processing.

Further particular and preferred aspects of the present invention are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
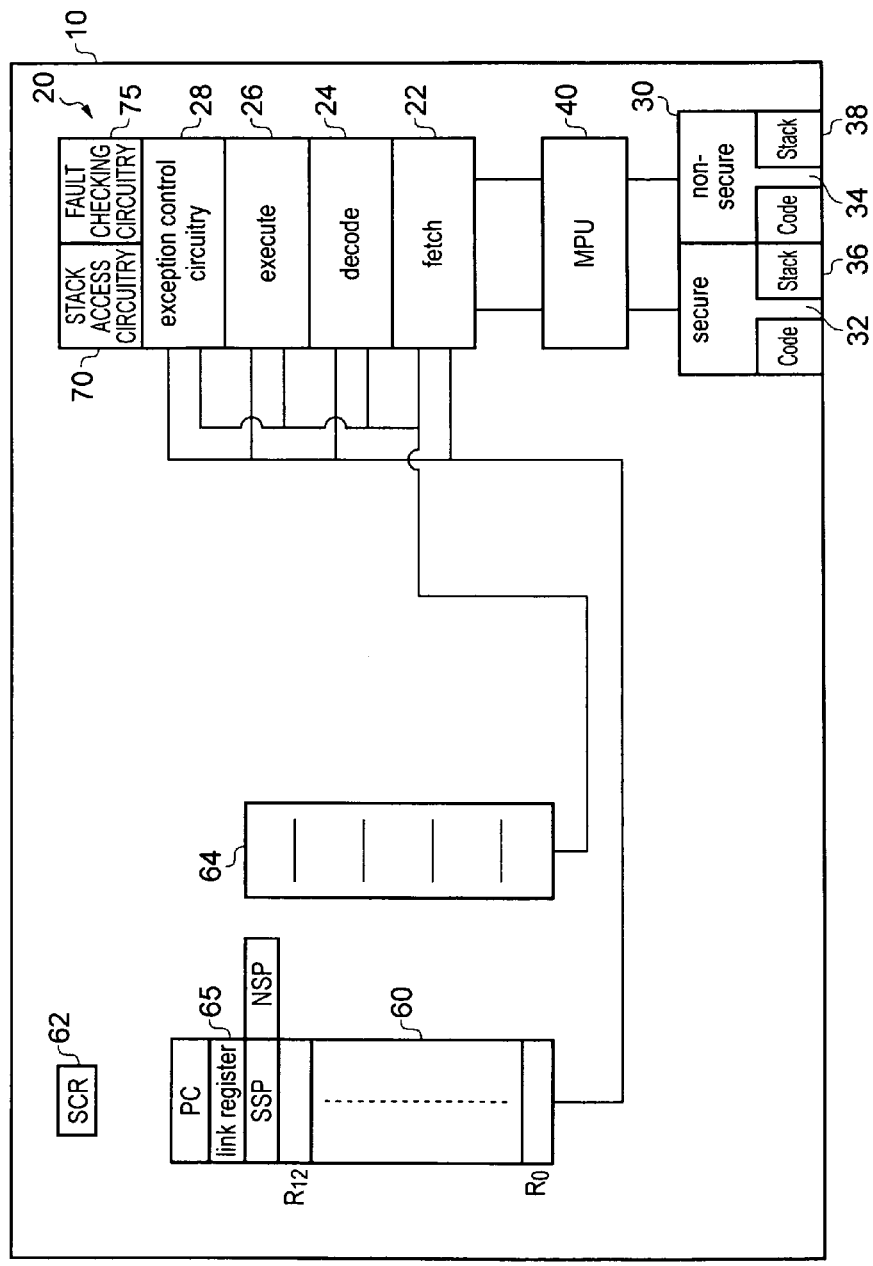
FIG. 1 shows a data processing apparatus according to one embodiment, having a data store with secure and non-secure regions.

FIG. 1 shows a data processing apparatus 10 which may for example be a microcontroller. It comprises processing circuitry 20 for processing instructions and a data store 30 for storing data that is processed by the processing circuitry 20 and also for storing the program code that the processing circuitry 20 executes.

Data store 30 has two regions of different security, a secure region 32 and a non-secure region 34 (also referred to herein as a less secure region). Data stored in the secure region 32 is not accessible to code that is stored in the non-secure region 34 when it is executing.

Data processing apparatus 10 also has a memory protection unit MPU 40 which controls access to the secure 32 and the non-secure 34 regions. Although this control may be performed through a memory protection unit, it may in other embodiments be done in a more distributed fashion by circuitry within the processing apparatus that monitors the region code that is currently being executed is stored in, and controls access to the different regions of the memory in dependence upon this.

In this embodiment, the security of the domain that the processing circuitry 20 is executing in may be determined from the region that the code currently being executed is stored in. Thus, secure program code stored in secure data store 32 is executed in the secure domain and uses secure stack 36 to store data values in. Similarly non-secure code stored in non-secure data store 34 is executed in the non-secure domain and uses non-secure stack 38 for storing data values during execution. Other techniques for determining the current domain of operation are also possible, e.g. based on a target domain value identifying which domain the processor should operate in following a control flow altering instruction.

Processing circuitry 20 has fetch circuitry 22 for fetching instructions to be executed. It also has decode circuitry 24 for decoding these instructions and execution circuitry 26 for executing them. Instructions to be executed are fetched by fetch circuitry 22 from data store 30 via the memory protection unit MPU 40. The instructions and data are retrieved via MPU 40 which controls the access to the secure and the non-secure regions and isolates the secure data from the non-secure side.

In this embodiment there is a register bank 60 which has general purpose registers which are used during data processing. These general purpose registers have a program counter PC which indicates which instruction is the next to be executed, and a stack pointer SP which indicates at which point in the stack the next data access should be made. In this embodiment, as there is a stack in the secure side and a stack in the non-secure side, there is a secure stack pointer SSP and a non-secure stack pointer NSP, but only one of these is directly visible to the program being executed at any one time. It should be noted that in some embodiments there may be plural stack pointers for each stack but again only one will be visible at any one time. There are also general purpose registers in register bank 60 for storing data values that are being processed by the processing circuitry 20. In this embodiment these are marked as R0 to R12.

Register bank 60 also comprises a link register 65 that may be used to store a return value when an exception is taken or a function is called. The return value allows the system to determine whether a return is an exception return or a function return, and to determine what processing is required on returning from the exception or function. Different kinds of return values may be used, including a function return address indicating the address of a program instruction to be processed following completion of a function, a dummy function return value indicating a function return for which the actual function address has been stored to the secure stack to hide it from the less secure domain, and an exception return (EXC_RETURN) value which indicates an exception return and can include information, such as an indication of the security level of the domain that the background processing was processed in, which can enable the processor to determine how to handle the exception return, e.g. which stack to access when restoring state and how many registers need to be loaded. The different forms of return value will be described later.

FIG. 1 also shows an additional register bank 64 which has additional special purpose registers such as floating point registers. In one embodiment, a value can be set in the secure configuration register (SCR) 62 to identify whether any of the registers in the additional register bank 64 can store secure data, and if so those registers will be considered to form part of a set of registers (along with the registers of the register bank 60) that needs to be managed when controlling a transition from the secure domain to the less secure domain, and vice versa.

There are a number of mechanisms which may cause a transition from the secure domain to the less secure domain, and vice versa. In accordance with the described embodiments, one allowed mechanism for transitioning between the security domains is a function calling mechanism, whereby a function call can be issued to cause execution of the current software routine to be temporarily halted in order to enable a transition to another software routine identified by the function call, this other software routine to be executed in either the secure domain or the less secure domain dependent on where that other software routine is stored within the data store 30. Once that other software routine has been executed, then a function call return is performed in order to return back to the execution of the original software routine that was temporarily halted. Whilst some function calls will identify a target software routine that is to be executed in the same domain as the current software routine, in other instances the target software routine may need execution in a different domain to the domain in which the current software routine is executing.

In accordance with the described embodiments, another mechanism which can be used to transition between the security domains is an exception mechanism. In accordance with this mechanism, on occurrence of an exception, execution of the current software routine will be temporarily halted, and instead execution will branch to an exception handling routine used to process the exception, the exception handling routine used being dependent on the type of exception occurring. Once the exception handling routine has been executed, an exception return will then be used to return back to the original software routine that was temporarily halted as a result of the exception occurring.

Exception control circuitry 28 is provided to control the taking of exceptions, and where these exceptions result in a transition from a more secure to a less secure domain the set of registers that may store sensitive data will be cleared prior to the taking of the exception to avoid data stored in these registers being available to the less secure side. The state stored in some or all of these registers will be stored on the secure stack under the control of the stack access circuitry 70, such that on return from the exception that state can be restored. For the purposes of exception handling, the stack access circuitry 70 used to control storing of register contents to the appropriate stack can be considered to form part of the exception control circuitry 28. However, more generally, there is also some stack access circuitry 70 associated with storing predetermined processing state to the secure stack on occurrence of a function call that requires a transition from the secure domain to the less secure domain, and accordingly the stack access circuitry 70 is identified separately to the exception control circuitry 28 within FIG. 1.

Further, as shown in FIG. 1, fault checking circuitry 75 is provided for detecting situations where software in the less secure domain is seeking to return to the secure domain via a return mechanism that is of a different type to the original mechanism used to transition from the secure domain into the less secure domain (for example by using a function call return to return from an exception, or an exception return to return from a function call). Whilst part of the fault checking circuitry 75 may be considered to be contained within the exception control circuitry 28 (namely the part that is responsible for checking exception returns), other parts of the fault checking circuitry 75 may be distributed elsewhere within the hardware of the processing circuitry. For example, the part that is responsible for checking function call returns may in one embodiment be associated with the fetch circuitry 22. The operation of the fault checking circuitry 75 will be discussed in more detail later.

Whilst in FIG. 1 the data store 30 contains a single secure region and a single less secure region, the techniques described herein are equally applicable to different implementations comprising more than two different security regions.

Also, while FIG. 1 shows the exception control circuitry 28 and stack access circuitry 70 as being separate from other parts of the processing circuitry 20 such as the execution stage 26, in practice the exception control circuitry 28 and stack access circuitry 70 may at least partly reuse some elements of the processing circuitry 20 to control processing of exceptions and stack operations.

Figure 2:
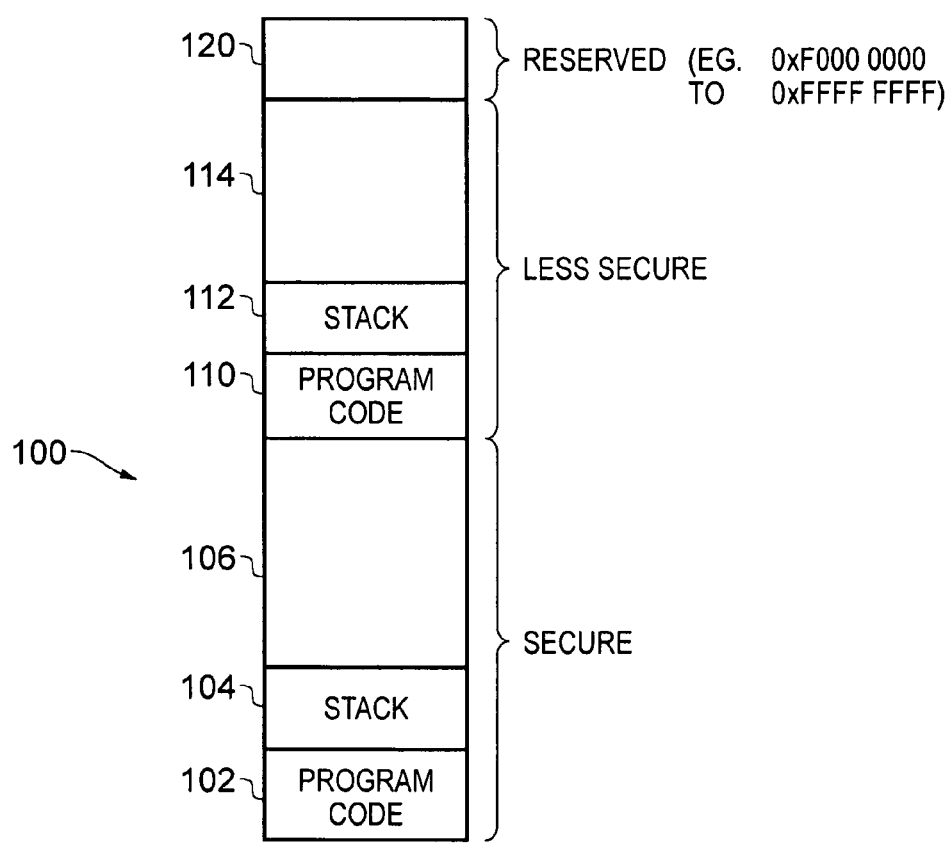
FIG. 2 schematically illustrates the memory address space in accordance with one embodiment.

FIG. 2 schematically illustrates the memory address space that may be used in one embodiment. The memory address space 100 will be partitioned to form one or more secure regions and one or more less secure regions. For simplicity, in FIG. 2 it is assumed that there is a single secure region and a single less secure region. A portion of the secure address space 102 will be set aside for the storage of program code to be executed in the secure domain, whilst another portion of the secure address space 104 will be allocated to the secure stack 36. The remainder of the secure address space 106 will be used for a variety of purposes, for example as a memory heap, as free space allocated during execution, etc. The less secure address space will also be partitioned in a similar way, thus providing a portion 110 for the storage of program code to be executed in the less secure domain, a portion 112 allocated to the less secure stack 38, and a remaining portion 114.

In accordance with the described embodiments, the memory address space also includes a reserved region 120, with any addresses in this region not being valid addresses for program code. As will be discussed in more detail hereafter, some of these reserved addresses are used to provide desired functionality for the described embodiments.

Figure 3A:
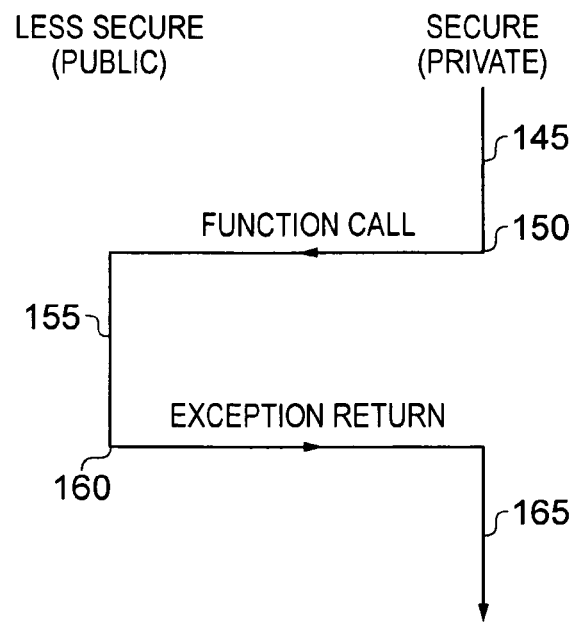
FIGS. 3A and 3B illustrate two different attack scenarios that the techniques of the described embodiments aim to provide protection against.
Figure 3B:
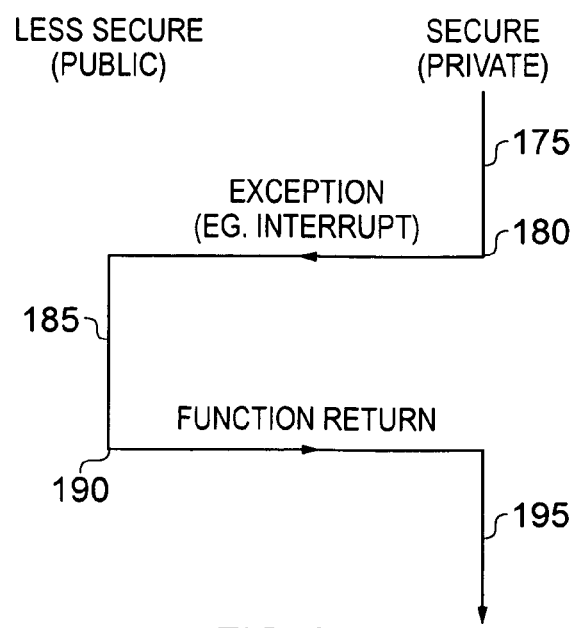

With the aim of improving speed and efficiency, the above described embodiments provide two mechanisms for transitioning between the secure and less secure domains, namely a function calling mechanism and an exception mechanism. However, the use of multiple domain transition mechanisms increases the vulnerability to malicious attack, for example allowing software in the less secure domain to seek to return to the secure domain via a return mechanism that is of a different type to the original mechanism used to transition from the secure domain into the less secure domain. Two specific attack scenarios are illustrated in FIGS. 3A and 3B. As shown in FIG. 3A, it is assumed that some secure code is executing at point 145, and at point 150 a function call is made to a function residing in the less secure domain. That function is then executed at point 155, but at point 160 the less secure software attempts to arbitrary branch into the secure code by using an exception return mechanism.

Similarly, in FIG. 3B, it is assumed that some secure code is executing at point 175, and at point 180 an exception (for example an interrupt) occurs causing a branch to an exception handling routine in the less secure domain. This exception handling routine is executed at point 185, but subsequently at point 190 the software in the less secure domain attempts to make a function return to the secure domain.

Both of the above attack scenarios need to be prevented if the security of the system is to be maintained, since if such scenarios were allowed to take place, this would allow less secure software to attempt to make an arbitrary branch into secure code, which could provide a mechanism for gaining access to secure data.

Figure 4A:
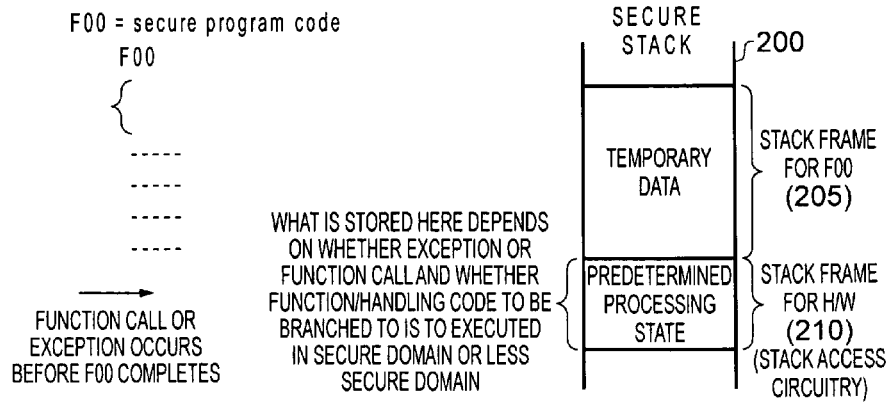
FIG. 4A schematically illustrates the storing of predetermined processing state on the secure stack upon receipt of a function call or an exception in accordance with one embodiment.

In order to protect against such attacks, the stack access circuitry 70 is arranged to store predetermined processing state onto a stack frame of the secure stack when a function call or an exception occurs that causes a transition from the secure domain to the less secure domain, as will be discussed in more detail with reference to FIGS. 4A and 4B. In FIG. 4A, it is assumed that a secure program FOO is currently executing in the secure domain, and that a function call or exception then occurs before FOO completes. Prior to the occurrence of the function call or the exception, FOO will typically use an allocated stack frame 205 on the secure stack 200 in order to store temporary data used by FOO. On occurrence of the function call or the exception, a separate stack frame 210 will then be allocated for the stack access circuitry 70, and the stack access circuitry will then store predetermined processing state within that stack frame 210 prior to branching to the required software routine identified by the function call, or to the exception handling routine required to handle the exception.

Figure 4B:
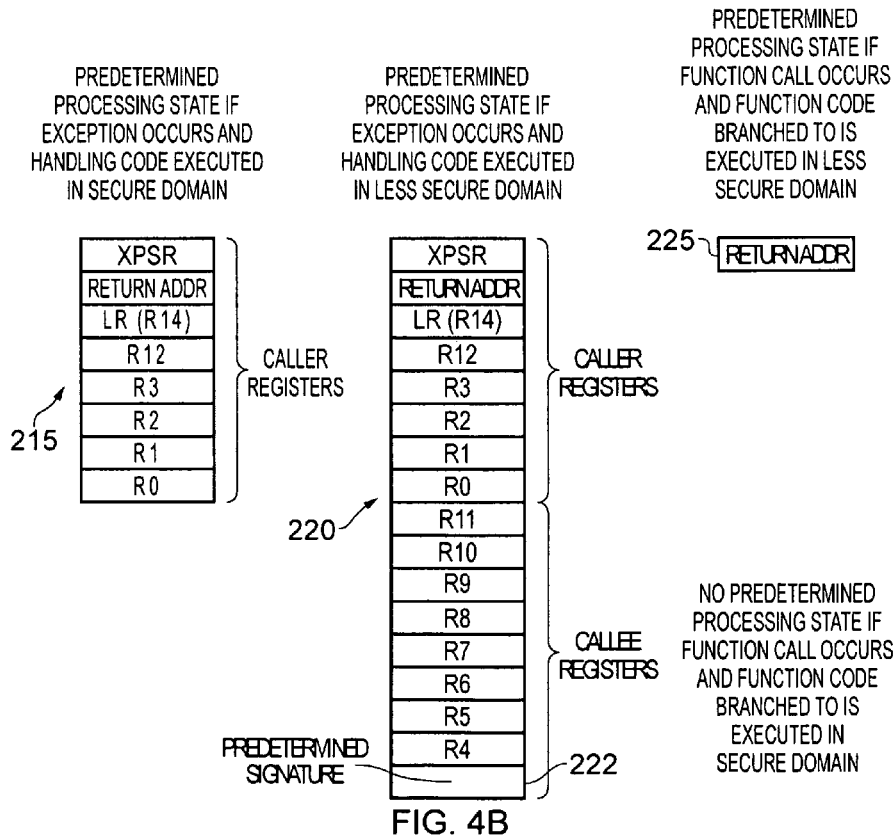
FIG. 4B illustrates the form of that predetermined processing state for various scenarios.

Considering first the situation where an exception occurs, then if the exception handling routine is to be executed within the secure domain, the predetermined processing state stored by the stack access circuitry within the stack frame 210 includes the contents of the registers 215 identified in FIG. 4B. These registers are referred to herein as the "caller" registers, and those are the registers that the stack access circuitry 70 (or exception control circuitry 28) will always take responsibility for state saving onto the stack, irrespective of the domain in which the exception handling routine is to execute. By default, the exception handling routine would then have responsibility for state saving the remainder of the registers (referred to herein as the "callee" registers). In particular, the exception handling routine would then save the state of the callee registers onto the stack associated with the domain in which the exception handling routine is executing, prior to reusing the registers in the body of the exception handling routine. Further, once the exception handling routine is completed, the exception handling routine would then be responsible for restoring the state of those callee registers (typically by copying them from the stack back into the relevant registers) prior to issuing an exception return.

However, in accordance with the described embodiments, in situations where the exception will require a transition from the secure domain to the less secure domain, and previous background processing was in the secure domain, the stack access circuitry 70 additionally takes responsibility for state saving the callee registers within the stack frame 210 prior to causing the processing circuitry to transition to execution of the exception handling routine. Accordingly, as shown in FIG. 4B, in this situation, the predetermined processing state stored within the stack frame 210 takes the form 220. It will be appreciated that the caller and callee registers specifically identified in FIG. 4B are purely an example of how the caller and callee registers may be partitioned, and exactly which registers are considered to be caller registers or callee registers will vary dependent on implementation.

As also shown in FIG. 4B, in the situation where the exception handling routine is in the less secure domain, thus requiring a transition from the secure to the less secure domain, the stack access circuitry is also arranged to store a predetermined signature 222 at a predetermined relative location within the stack frame 210, in the embodiment shown this predetermined relative location being the bottom location within the stack frame. This predetermined signature can take a variety of forms, but in one embodiment is chosen to have a value which does not correspond to a valid address for program code. In one embodiment, the predetermined signature is chosen to have one of the address values 120 in the reserved portion of the memory address space. In one particular embodiment, the predetermined signature has the value 0xF0A5125A.

Typically, on occurrence of a function call, the stack access circuitry 70 would normally not store any predetermined processing state within the stack frame 210. Accordingly, if the function call identifies target code that is still within the secure domain, no predetermined processing state is stored. However, if the function call identifies target code within the less secure domain, then the stack access circuitry 70 is arranged to store within the stack frame 210 the return address 225 that will be required in order to resume execution of FOO once the function call has been completed. This return address 225 is stored at the same predetermined relative location as the predetermined signature 222 is stored at in the event of an exception occurring which requires a transition to the less secure domain, i.e. the bottom location within the stack frame.

In place of the actual return address 225 stored within the secure stack, the target code within the less secure domain is provided with a dummy function call return address that is not in fact a valid address for program code. In one embodiment, that dummy function call return address is chosen from one of the reserved addresses 120, and is further chosen to have a different value to the earlier-mentioned predetermined signature 222.

Figure 5:
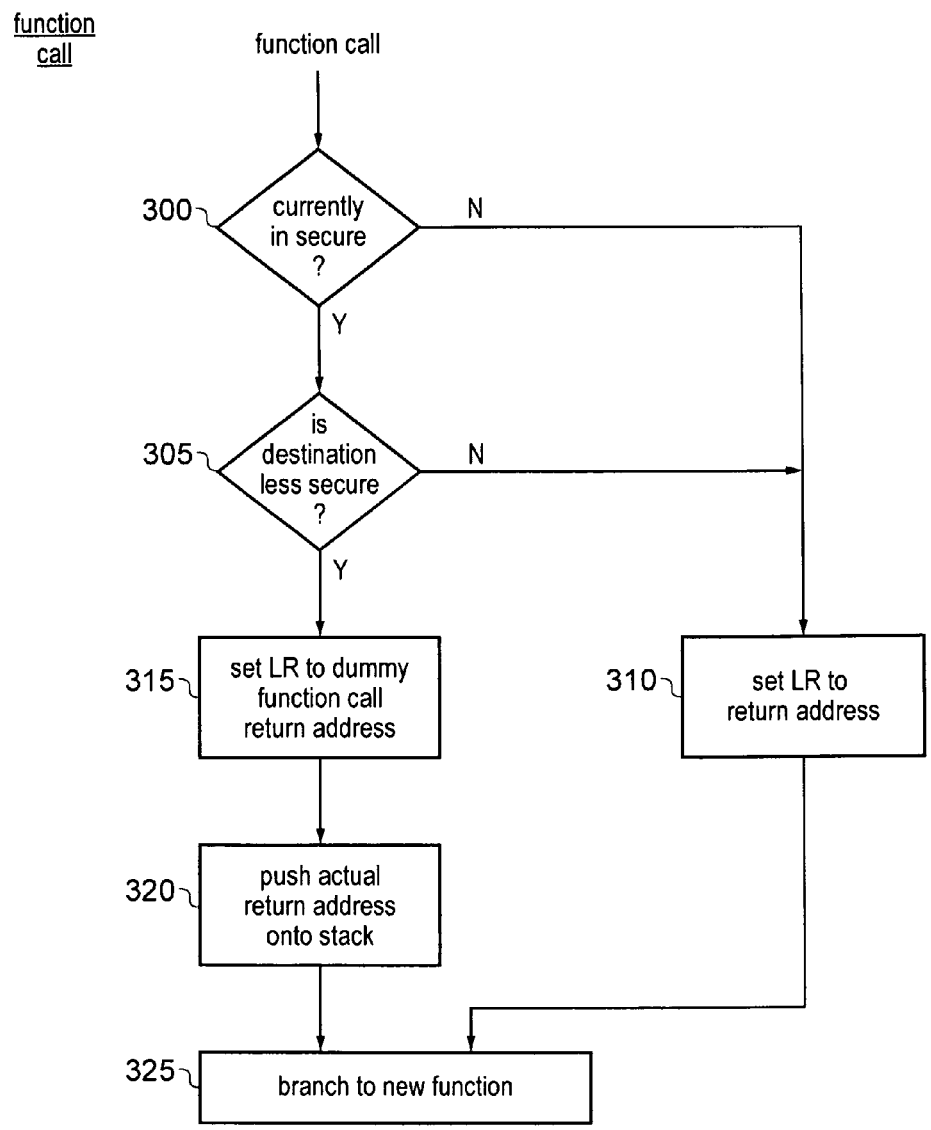
FIG. 5 is a flow diagram illustrating the operation of the processing circuitry in one embodiment upon receipt of a function call.

On occurrence of a function call, the software may still perform state saving of register state, even if state saving is not required by the hardware according to the stack frames shown in FIG. 4B. The division of the registers into caller and callee registers is useful for such function calls, because it allows both the software executed before the function call (the caller software) and the software executed after the function call (the callee software) to influence which registers are subject to state saving. For example, if the caller software is aware that it has not used certain caller registers, or has finished using data in some caller registers, then the values in those registers would not need to be maintained after the function call and so these registers do not need to be subject to state saving. Similarly, if the callee software will not be using certain callee registers then it does not have to perform state saving for these registers. Hence, allowing both the caller and callee software to influence selection of registers for state saving enables a performance improvement by reducing the amount of state saving when appropriate. In comparison, if only the caller software or only the callee software had responsibility for state saving, then some registers might be saved unnecessarily just in case the other software requires that register to be saved. FIG. 5 is a flow diagram illustrating the steps performed by the processing circuitry on occurrence of a function call, in accordance with one embodiment. At step 300, it is determined whether the currently executing code is being executed in the secure domain. If not, then the process proceeds directly to step 310, where the link register (LR) is set equal to the return address. Thereafter, the process proceeds to step 325, where a branch is performed to the new function (i.e. the program code identified as a target for the function call). Since the return address has been set within the link register, when the new function has completed, the correct return address can be specified within the function call return.

If at step 300 it is determined that the currently executing code is being executed in the secure domain, it is then determined at step 305 whether the new function that is the destination for the function call is to be executed in the less secure domain. There are a number of ways in which this can be determined, but in one embodiment this is achieved simply by determining whether the target address for the function call is an address associated with the secure memory region or the less secure memory region. If it is associated with the less secure memory region, this indicates that the destination for the function call is in the less secure domain. If the destination for the function call is not in the less secure domain, then again the process proceeds to step 310.

However, if the destination for the function call is in the less secure domain, then this indicates the requirement for a transition from the secure domain to the less secure domain, and at this point the process proceeds to step 315, where the link register is set to a dummy function call return address as discussed earlier. In addition, at step 320, the actual return address is pushed onto the secure stack by the stack access circuitry 70. Thereafter, the process proceeds to step 325, where a branch is performed to the new function that is the target of the function call.

As well as the hardware operations shown in FIG. 5, the software executing before the function call may also perform state saving of the data from the registers, and the software executing after the function call may also perform state saving of the data from the callee registers.

Figure 6:
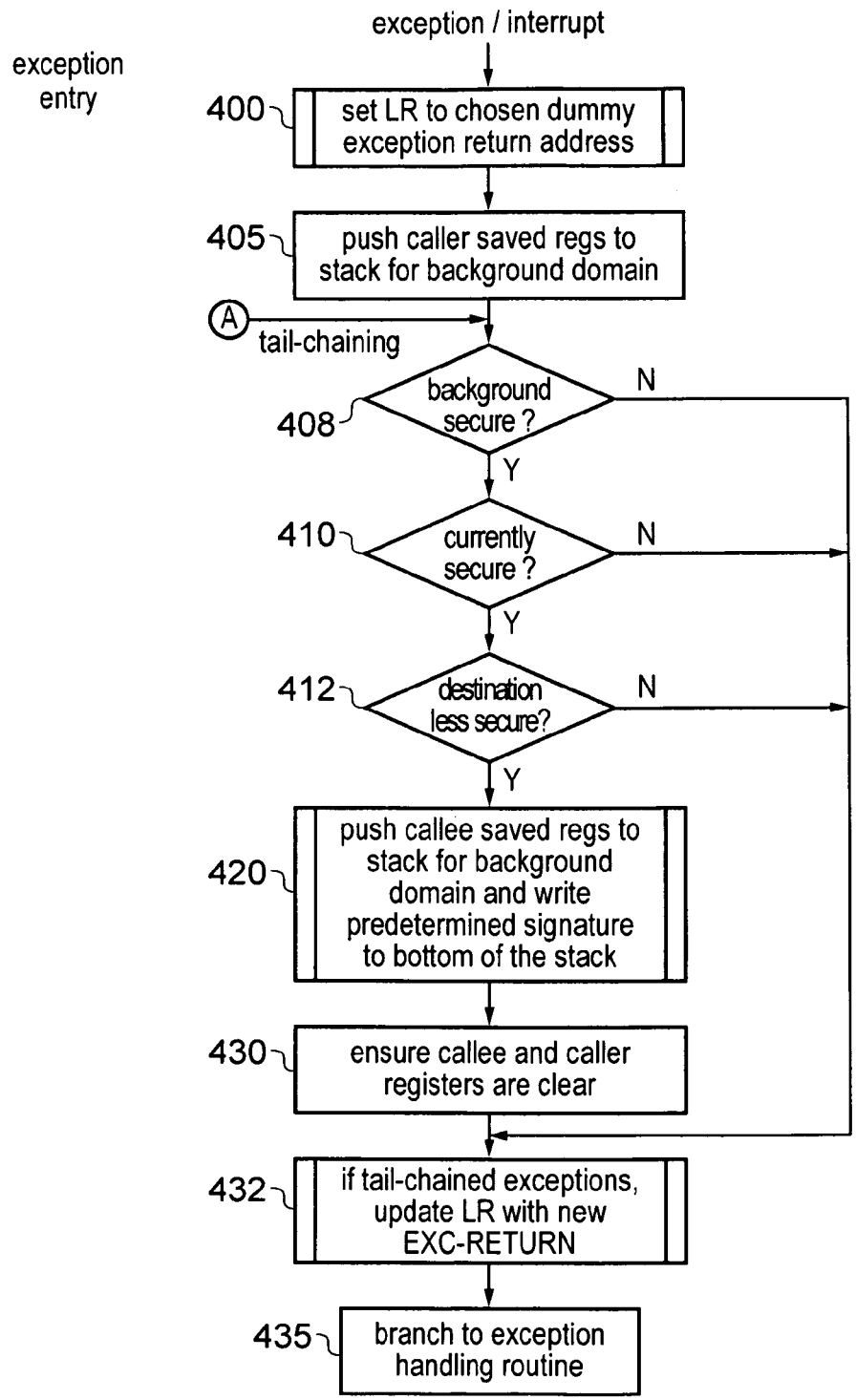
FIG. 6 is a flow diagram illustrating the operation of the processing circuitry in one embodiment upon receipt of an exception.

FIG. 6 is a flow diagram illustrating the operation of the processing circuitry on occurrence of an exception (one example of an exception being an interrupt). At step 400, the link register is set to a chosen dummy exception return address, in one embodiment there being multiple different dummy exception return addresses that can be chosen. In one embodiment, each of the possible dummy exception return addresses will be addresses that are not valid addresses for program code. More details of step 400 will be described later. Thereafter, at step 405, the caller saved registers are pushed onto the stack for the background processing domain, i.e. the domain in which the background code was being executed in.

Thereafter, at step 408 it is determined whether the background processing was in the secure domain, and if not the process processed directly to step 432. As shall be described below, whether the background processing was in the secure domain can be determined based on the exception return value placed in the link register 65. If the background processing was in the secure domain, then at step 410, it is determined whether the currently executing code is being executed in the secure domain, and if not the process again proceeds directly to step 432. If however it is determined at step 410 that the currently executing code (which may be the background processing or may be an earlier tail-chained exception) is being executed in the secure domain, then it is determined at step 412 whether the destination is in the less secure domain, i.e. whether the exception handling code required to process the exception will be executed in the less secure domain. If not, then again the process proceeds directly to step 432. However, if the destination is in the less secure domain, then this indicates a situation where there will be a transition from the secure domain to the less secure domain where the background processing was in the secure domain. Accordingly, the process proceeds to step 420, where the callee saved registers are pushed onto the stack for the background domain, and the earlier-mentioned predetermined signature is written to the bottom of the stack frame. The stack associated with the background processing can be determined from the exception return value placed in the link register 65. More details of this step will be provided later.

At step 430 the exception control circuitry 28 ensures that all of the registers are cleared. In one example, all the registers may be cleared at step 430. It is possible in an alternative embodiment for the registers to be cleared as they are pushed onto the stack, and accordingly the caller registers may be cleared during step 405 and the callee registers may be cleared during step 420 or 430.

Following step 430, or if any of the conditions checked at steps 408, 410 and 412 did not occur, then the process then proceeds to step 432. If the exception entry is to a tail-chained exception, then the link register 65 is updated with a new exception return value. This step will be discussed in more detail with respect to FIG. 12B below.

At step 435, the processing branches to the exception handling routine.

The exception handling routine may then perform state saving of the callee registers. In one embodiment, the exception handling routine may always perform state saving of the callee registers, even in the case where the data in the callee registers has already been pushed to the stack at step 420 and cleared (in this case, the hardware would have stored the data from the callee registers to the secure stack while the software would be storing the cleared values from the callee registers to the less secure stack). Alternatively, the exception handling routine may be able to detect whether the state saving of the callee registers has already been performed and if so may omit the state saving of the callee registers.

Figure 7:
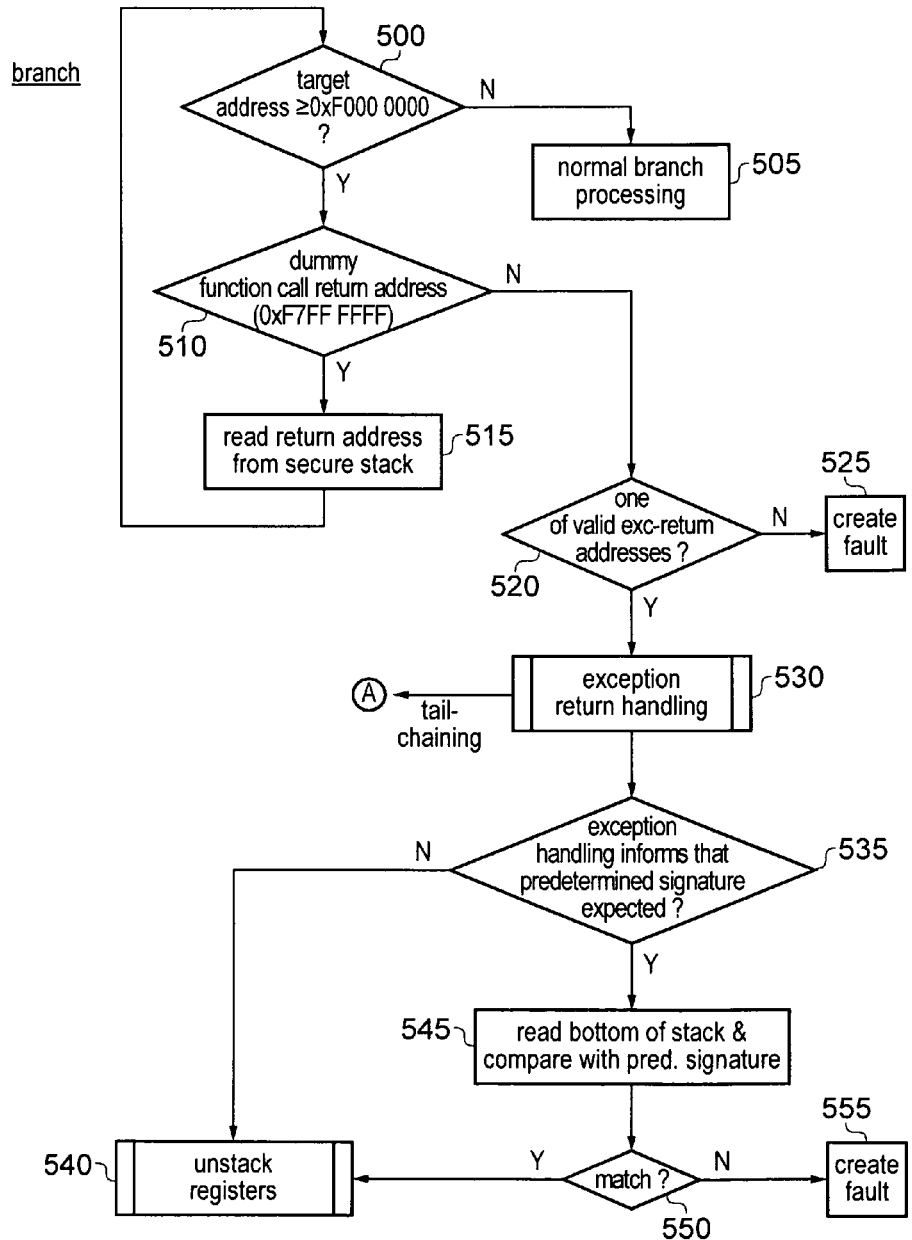
FIG. 7 is a flow diagram illustrating the operation of the processing circuitry in one embodiment when handling a branch operation, including situations where the branch operation is a function call return or an exception return.

FIG. 7 is a flow diagram illustrating how branch operations are processed. Such branch operations may include normal branch processing operations, function call returns and exception returns. Whilst FIG. 7 is shown for branch operations, in alternative embodiments a similar mechanism can be used in association with any instruction which may cause a change in instruction flow, for example a load instruction that has the program counter as the destination register.

At step 500, it is determined whether the target address specified by the branch operation is within the reserved address range 120, in this particular example this being the case if the target address is greater than or equal to 0xF0000000. If not, then this indicates normal branch activity, and the process proceeds step to 505 where normal branch processing is performed. As the handling of branch operations will be well understood by those skilled in the art, no further details of the normal branch processing is provided herein.

If at step 500 it is determined that the target address is within the reserved address range 120, then at step 510 it is determined whether the target address corresponds with the dummy function call return address. In one particular embodiment, the dummy function call return address is 0xF7FFFFFF. If the target address does correspond to the dummy function call return address, then at step 515 the earlier mentioned predetermined relative location of the stack frame 210 within the secure stack is accessed in order to read the return address from the secure stack. Thereafter, the process returns to step 500 where, assuming the function call return has been used correctly to return from an earlier function call, the return address read at step 515 will be a real address for program code, and accordingly the process will branch to normal branch processing at step 505. However, if instead the function call return had been used incorrectly as a mechanism to return from an exception, then when the stack frame 220 is accessed at step 515, the predetermined signature 222 will be retrieved as the actual return address. When that address is then analysed at step 500, it will be determined that it is within the reserved range, but at step 510 it will be determined that that address is not the dummy function call return address. The process will then proceed to step 520, where it will also be determined that that address is not one of the valid exception return addresses, and accordingly the process will branch to step 525, where a fault will be created to identify that a function call return has been used incorrectly.

Considering now the situation where an exception return is specified, then if this exception return is associated with an earlier exception causing a transition from the secure to the less secure domain, this will identify as a target address one of a number of different valid exception return addresses, each of those possible exception return addresses being within the reserved range 120, and being different to both the predetermined signature and the dummy function call return address. Accordingly, the process will proceed from step 500 to step 510, and from there to step 520, where the yes path will then be followed to step 530. Details of the exception return handling step 530 will be described later. In situations where a new exception of lower or equal priority than the current exception and higher priority than the background processing is awaiting execution at the time this current exception returns, then that new lower priority exception will be taken as a tail chained exception (i.e. that new exception will be processed immediately following completion of the current exception, prior to returning to background processing that was taking place prior to the current exception being taken), and the process will branch as shown in FIG. 7 back to step 408 in FIG. 6.

Once the exception return handling of step 530 has been performed and no further tail-chained exception is pending, the process proceeds to step 535 where it is determined whether the exception return handling step 530 has indicated that a predetermined signature should be expected within the processing state stored within the stack frame 210. As discussed earlier, this will be the case if an exception caused a transition from the secure domain to less secure domain, and the background code was executed in the secure domain. If no predetermined signature is expected, then the process merely proceeds to step 540, where the relevant register values are unstacked from the stack frame. This process will be described in more detail later with respect to FIG. 13.

However, if at step 535, it is determined that a predetermined signature is expected, then the process proceeds to step 545, where the bottom of the stack frame 210 is read, and the value retrieved is compared with the predetermined signature. At step 550, it is determined whether there is a match, and if so the process proceeds to step 540. However, if there is not a match, then the process proceeds to step 555, where a fault is created, indicating that an exception return has been incorrectly used to seek to return from a function call. In particular, if the exception return was incorrectly being used to attempt to return from a function call, the reading of the secure stack at step 545 will result in the return address 225 being retrieved, which will not match the predetermined signature, and will accordingly cause the fault to be created at step 555.

There are a number of ways in which the faults created at step 525 or step 555 can be processed. In one embodiment, the processing circuitry is responsive to either fault condition to execute appropriate fault handling program code within the secure domain. By ensuring that the fault handling program code is executed within the secure domain, this prevents an attacker in the less secure domain from regaining control, and accordingly from retrying the attack.

As an alternative mechanism for thwarting any retry of the attack, the data processing apparatus may be arranged such that the stack pointer value is not adjusted if either fault condition is identified, such that replay of the return will also cause the same fault condition to be identified. Accordingly, by not adjusting the stack pointer, the attacker cannot merely consume the last location of the secure stack and then retry the attack in order to enter at a different place within the secure stack. In one embodiment, both of the above mechanisms can be used to provide robustness against retrying of the attack from the less secure domain.

Figure 8A:
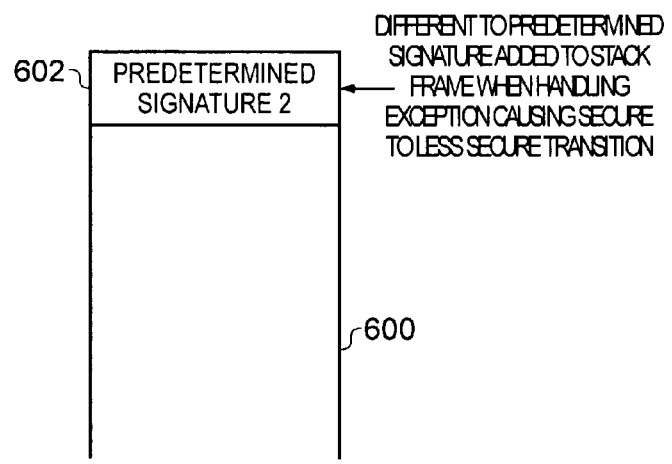
FIGS. 8A and 8B schematically illustrate how a predetermined signature stored on the secure stack when the secure stack is initialised can be used to prevent an unauthorised attempt to branch into secure code from the less secure domain in accordance with one embodiment.
Figure 8B:
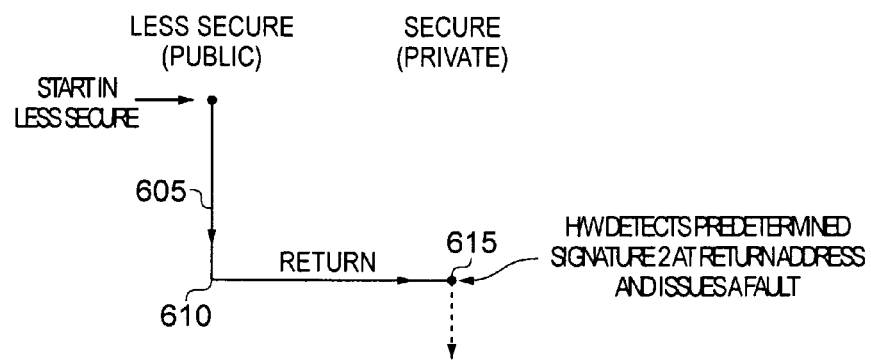

In one embodiment, another scenario that may give rise to a potential attack from the less secure domain arises following initialisation of the secure stack. At this point, the secure stack will be empty. If at that time, the program code being executed is in the less secure domain, it is possible that the program code may attempt to return into the secure domain. Such a return should be prevented, since there is no original transition from the secure domain to the less secure domain to be legitimately returned from. FIGS. 8A and 8B illustrate a mechanism that can be used to prevent such a return being successful. As shown in FIG. 8A, when the secure stack 600 is initialised, a predetermined signature value 602 is stored on the secure stack (in one embodiment, this value being stored by software when the stack is initialised). This predetermined signature value will typically be different to the predetermined signature 222 described earlier with reference to FIG. 4B, but again will be a value that does not correspond to a valid address for program code. In one particular embodiment the predetermined signature 602 has the value 0xF05AEDA5.

As shown in FIG. 8B, if software is executing in the less secure domain at point 605, and then at point 610 attempts to make a return into the secure domain, the fault checking circuitry will at point 615 read the predetermined signature value 602 from the secure stack, will determine that that does not correspond to a valid address for program code, and accordingly will create a fault. Accordingly, the return from the less secure domain will be prevented.

In particular, if the return at point 610 is a function call return, the fault generated at point 615 is the same as the fault created at step 525 in FIG. 7, and the same fault handling code can be used in response to the fault. Hence, in that embodiment, the fault checking circuitry does not need to distinguish between the predetermined signature 602 and the earlier-mentioned predetermined signature 222. If, instead, the return at point 610 is an exception return, then the fact that the predetermined signature value 602 is different to the predetermined signature value 222 will mean that no match will be detected at step 550 of FIG. 7, and accordingly a fault will be raised at step 555.

Figure 9:
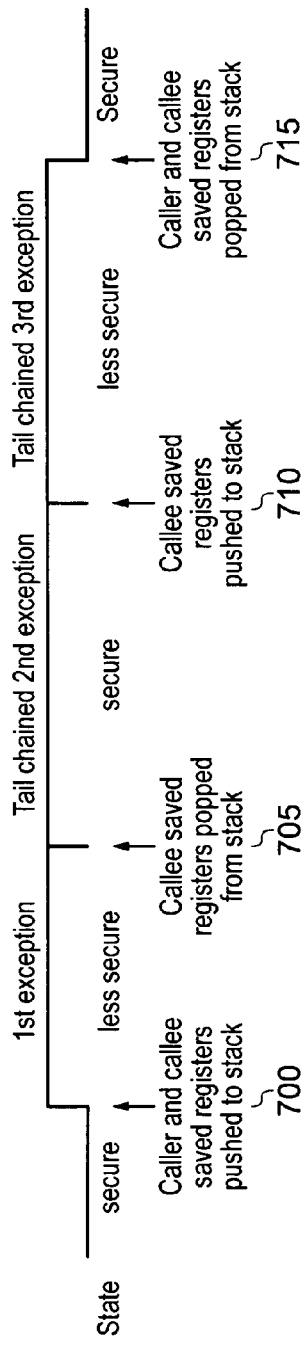
FIG. 9 illustrates an example of performing state saving and restoring operations when handling a chain of tail-chained exceptions.

As described with respect to step 530 in FIG. 7, when returning from one exception, a second exception may be pending and may be processed before returning to the background processing that was performed before the first exception. This is known as tail-chaining. FIG. 9 shows an example where following a first exception, second and third exceptions are tail-chained before switching back to the background processing.

As shown in stack frame 220 of FIG. 4B, if the background processing is in the secure domain and there is a transition from secure processing to an exception in the less secure state, then both the caller saved registers and the callee saved registers are pushed to the secure stack by the exception control circuitry 28. However, typically exceptions that are processed in the secure domain would expect that only the caller saved registers would have been saved to the stack (as shown in stack frame 215 of FIG. 4B), with saving of the callee saved registers being left to the exception handling routine. Therefore, as shown in FIG. 9 it is possible that when the additional state saving of the callee registers has been performed at point 700 on entering the first exception, then when switching to the second exception in the secure domain at point 705, the callee saved registers could be popped from the stack to restore the stack frame 215 that is expected for the tail chained second exception to be processed in the secure domain.

However, if a tail-chained third exception to be processed in the less secure domain occurs, then at point 710 the callee registers need to be pushed to the stack again, because the transition from the secure domain to the less secure domain means that the data in the callee registers need to be hidden from the less secure processing. Finally when the third exception completes and there is no further tail-chained exception, then both the caller and callee saved registers are popped from the stack at point 715 of FIG. 9.

FIG. 9 shows several state saving operations and state restoring operations being performed when switching between tail-chained exceptions. These operations take time and hence delay processing of the incoming exception, and therefore reduce processing performance. Therefore, it is useful to avoid some of these operations. The present technique recognises that it is not necessary for the callee registers to be popped from the secure stack when switching from a less secure exception to a tail-chained secure exception. It is acceptable to leave the callee registers on the stack as this does not affect the processing of the exception and all the secure callee saved values are allowed to be accessed from the secure domain in which the exception is to be processed. Therefore, the callee registers can be saved to the stack in response to the first exception causing a transition from the secure domain to the less secure domain. Restoring of the callee registers can be omitted when processing switches from a less secure exception to a secure tail-chained exception. For further exceptions causing a transition from the secure domain to the less secure domain, the additional state saving of the callee saved registers by the hardware can be omitted.

Figure 10:
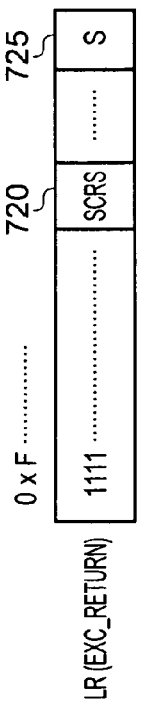
FIG. 10 illustrates an example of using part of an exception return value to indicate status information for controlling state saving operations.

FIG. 10 shows an example of an exception return value which can be stored in the link register on entry to an exception. In one embodiment, the link register 65 need not hold the exception return value for the entire time the exception handling routine is being executed, and instead it may be set to this value at the start, and then moved to the stack shortly after. When the exception completes, the software branches to the address indicated by the exception return value, which the CPU spots as a special event since it is not a valid instruction address. In one embodiment, the earlier mentioned dummy function call return address is also stored in the link register on occurrence of a function call, and handled in a similar manner.

The exception return value includes information for determining whether or not saving of the callee saved registers by hardware is required on entry to an exception causing a transition from the secure domain to the less secure domain. The exception return value has several different possible values, each corresponding to the reserved region 120 of the address space and being different to the dummy function return address and the predetermined signature 222 and 602 described earlier. The exception return address includes a state saving status value field 720 and a security field 725.

The state saving status value field 720 stores a state saving status value SCRS indicating whether, for a following exception which causes a transition from the secure domain to the less secure domain, additional state saving of the callee saved registers is required. In the example of FIG. 10, a value of 0 indicates that the additional state saving can be skipped while a value of 1 indicates that additional state saving is required, although other mappings of the status value can also be used.

The security field 725 stores a security domain value S indicating whether background processing, which was being performed before the initial exception in the current chain of tail-chain exceptions, was in the less secure domain or the secure domain. On entry to each exception in a chain of tail-chained exceptions, the exception return value will be set to a new value in step 432 of FIG. 6. When setting the exception return value, the value of the state saving status value field 720 can be changed to influence the state saving processing to be performed later on. In this way, information can be passed from one exception to another exception to indicate whether additional state saving is required on the next transition between exceptions. This will be explained with reference to FIGS. 11-16.

Figure 11:
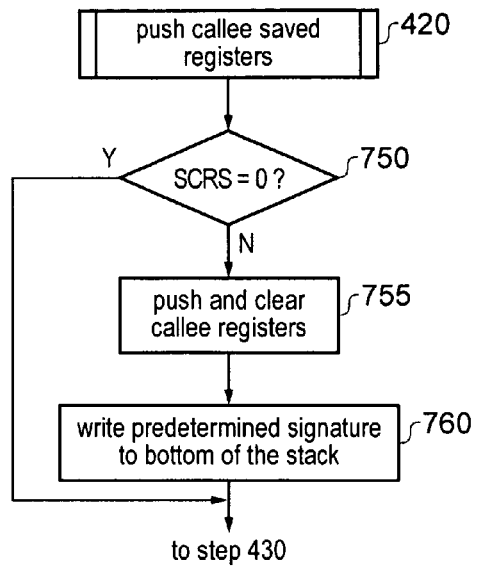
FIG. 11 is a flow diagram showing in more detail a first example of performing state saving of callee registers.

FIG. 11 shows in more detail step 420 of FIG. 6 for pushing the callee saved registers and writing the predetermined signature to the secure stack 36. This additional state saving is dependent on the value of the state saving status values field 720 of the exception return value. At step 750 the processor determines whether or not the state saving status value field 720 of the exception return value has a value of zero. If so, then pushing of the callee saved registers to the stack is skipped and the method continues with step 430 of FIG. 6. In this case, state saving of the callee saved registers would not be necessary because the data from these registers will already have been saved to the stack in response to an earlier exception.

On the other hand, if at step 750 the state saving status value does not have a value of zero then the method proceeds to step 755, and the data from the callee saved registers is pushed to the secure stack. The callee saved registers are also cleared so that their values are inaccessible to subsequent processing in the less secure domain. Also, at step 760 the predetermined signature 222 is written to the bottom of the stack. Then the method proceeds again to step 430 of FIG. 6. Hence, according to FIG. 11, whether or not the additional state saving performed is conditional on the value of the state saving status field.

Figure 12A:
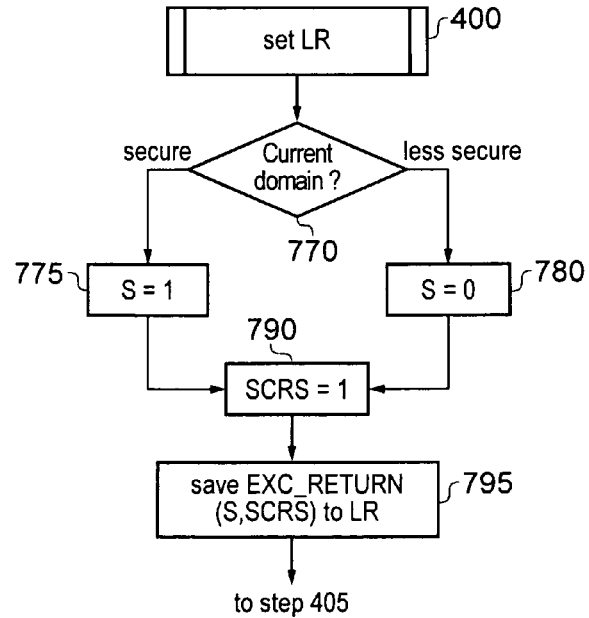
FIG. 12A is a flow diagram showing an example of setting an exception return address on entering an initial exception.

FIG. 12A shows an example of setting the exception return register at step 400 of FIG. 6 for an initial exception received while performing background processing (if there is a chain of tail-chained exceptions this is the very first exception). At step 770, the current domain, in which the processor is operating for the background processing, is determined. If the current domain is the secure domain then at step 775 the security domain field 725 is set to have a value of 1 to indicate the secure domain. If the current domain is a less secure domain then at step 780 the security domain field 725 is set to a value of 0. Regardless of which domain is the current domain, at step 790 the state saving status value field 720 is initialized to a value of 1 indicating that additional state saving may be required at the next transition from the less secure domain to the secure domain. Then, at step 795 the exception return value is written to the link register 65, with the state saving status value field 720 and security field 725 set to the values determined in the earlier steps. The method then proceeds back to step 405 of FIG. 6 to continue the exception entry processing.

Figure 12B:
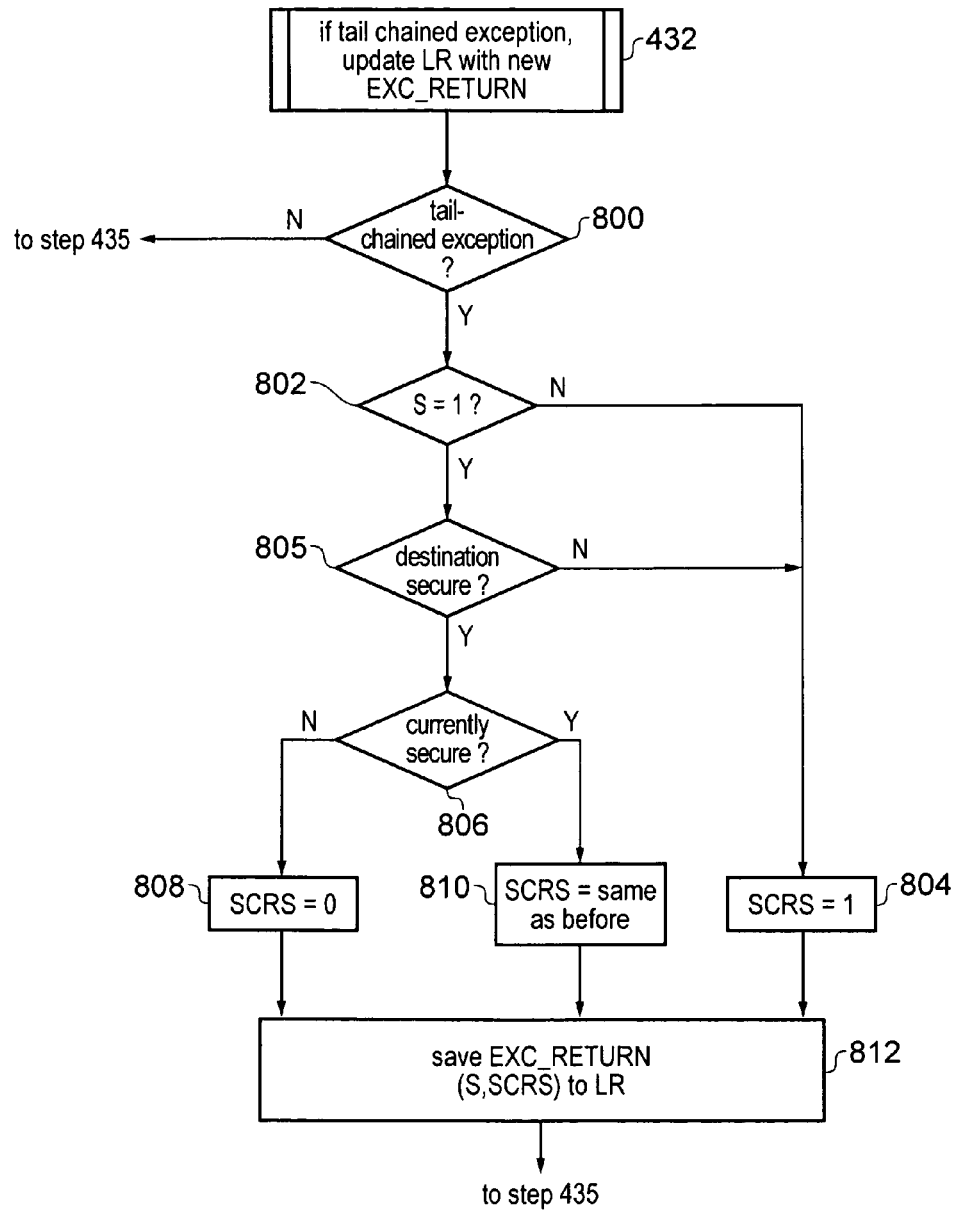
FIG. 12B is a flow diagram showing an example of setting an exception return address on entering a tail-chained exception.

FIG. 12B shows in more detail an example of step 432 for setting the exception return value for a tail-chained exception. At step 800, the method determines whether the exception being entered is a tail-chained exception. If not, then the method proceeds to step 435 of FIG. 6 to branch to the exception handling routine, without performing the remaining steps of FIG. 12B. However, if the exception is a tail-chained exception then at step 802 it is determined whether the security domain value S (from the EXC_RETURN value in FIG. 10 used to terminate the previous exception in the chain) is 1. If not, then S=0 and the process proceeds to step 804 to set the state saving status value to 1. If the background processing was less secure (as indicated by S=0), no additional state saving will have been performed (step 408 of FIG. 6 will have caused the additional state saving step 420 to be omitted). While the state saving status value field 720 will in this case not affect state saving, to prevent processing in the less secure domain gaining information from the state saving status value field 720 it is safest to set the field to a default value of 1 at step 804.

On the other hand, if at step 802 the security domain value S equals 1, then the process proceeds to step 805 where it is determined whether the new tail-chained exception is to be processed in the secure domain. If not, then again at step 804 the state saving status value field 720 is set to 1.

If the new exception is to be processed in the secure domain, then at step 806 it is determined whether the current processing is in the secure domain. If not, then at step 808 the state saving status value field 720 is set to 0, while if the current processing is secure then at step 810 the state saving status value field 720 is set to the same value it had for the previous exception. At step 812, the new exception return value is written to the link register 65, with the state saving status value field 720 set according to steps 804, 808 or 810. The method then proceeds to step 435 of FIG. 6 to branch to the exception handling routine.

Figure 13:
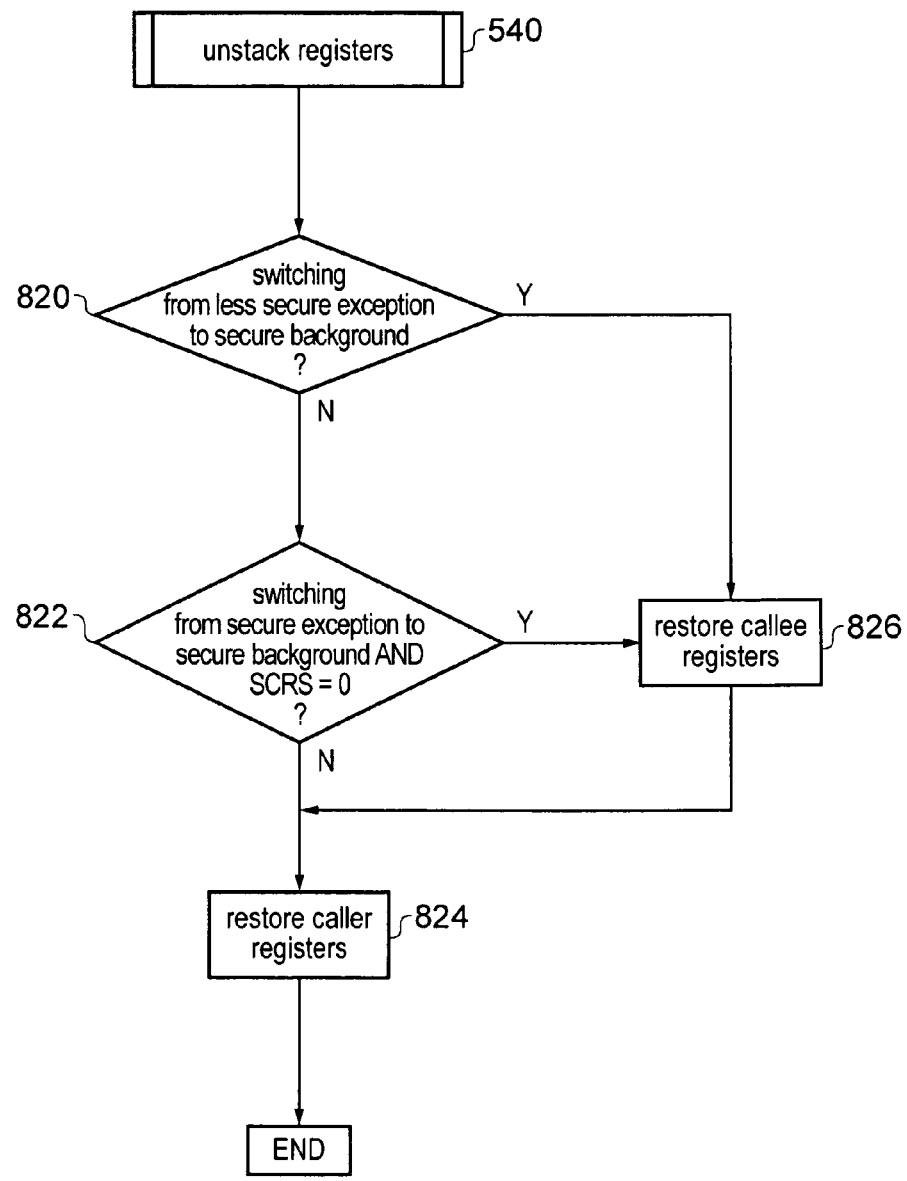
FIG. 13 is a flow diagram showing an example of state restoring performed on returning from an exception.

FIG. 13 shows in more detail step 540 of FIG. 7 for unstacking registers. Depending on the past history of exception processing, the stack may include either the stack frame 215 for which only the caller registers need to be restored or the stack frame 220 for which both the caller and callee saved registers need to be restored. FIG. 13 shows how the processor can determine which stack frame will be present on the stack. At step 820 it is determined whether the current exception return is switching from a less secure exception to secure background processing. For example, the security domain field 725 can be used to determine whether the background processing is secure or less secure. If processing is not switching from a less secure exception to secure background processing, then at step 822 the process determines whether the current exception return is switching from a secure exception to secure background processing and the value of the state saving status value field 720 is zero. If neither of the conditions determined in steps 820 and 822 is satisfied then at step 824 only the caller registers have their values restored from the stack. However, if either of the conditions tested in steps 820 and 822 are satisfied then at step 826 the callee saved values are restored to the callee registers before restoring data to the caller registers at step 824. Hence, the system can determine which registers need their register state to be restored.

Figure 14:
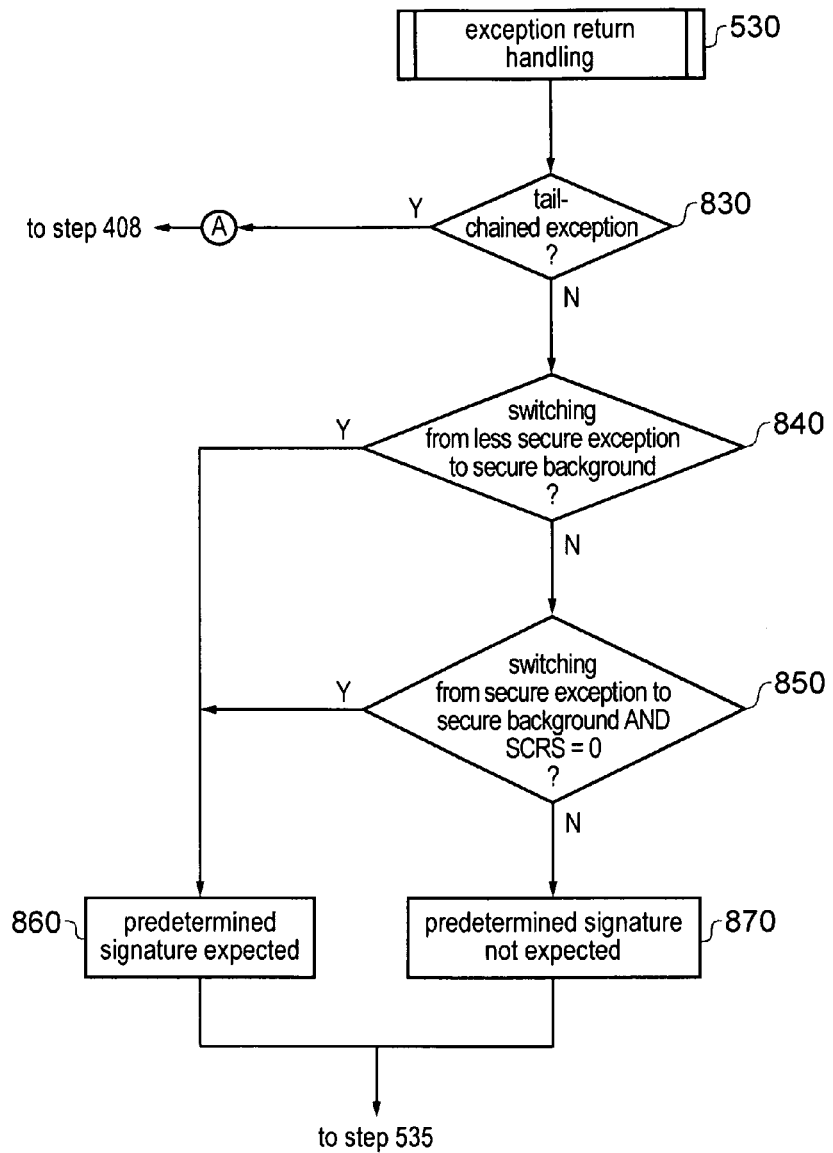
FIG. 14 is a flow diagram showing exception return handling in more detail.

FIG. 14 shows in more detail the exception return handling step 530 of FIG. 7. At step 830 it is determined whether or not there is a pending exception which should be tail-chained. The exception should be tail-chained if its priority is lower than, or equal to, the priority of the exception which has just completed, and is higher than the priority of the background processing. If there is a tail-chained exception to be processed, then the method returns to step 408 of FIG. 6 to handle entry to the tail-chained exception.

If there is no tail-chained exception then the method proceeds to steps 840 and 850 where it is determined whether either (a) the exception return is switching from a less secure exception to secure background processing; or (b) the exception return is switching from a secure exception to secure background processing and the state saving status value field has a value of 0. If either of these conditions is satisfied, then at step 860 it is determined that the predetermined signature 222 is expected. If none of these conditions is satisfied then it is determined at step 870 that the predetermined signature is not expected. The method then proceeds to step 535 of FIG. 7 where processing is performed to detect whether an exception return has inappropriately been used, based on whether the predetermined signature 222 is expected. Note that steps 840 and 850 check for the same two conditions as steps 820 and 822 of FIG. 13, because as shown in stack frame 220 of FIG. 4B, when the callee saved register values are present on the stack, then the predetermined signature will also be expected.

Figure 15:
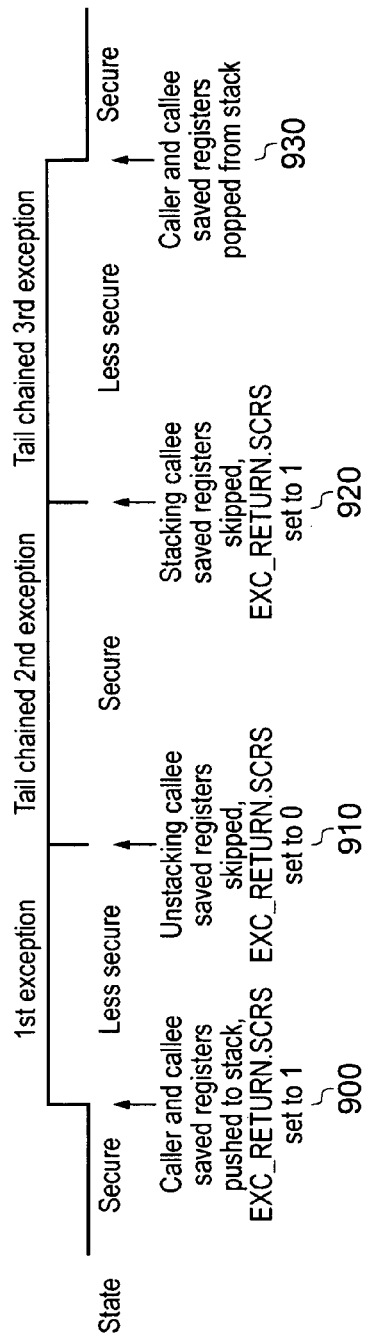
FIGS. 15 and 16 show examples in which unnecessary state saving and restoring operations can be avoided using the status information shown in FIG. 10.
Figure 16:
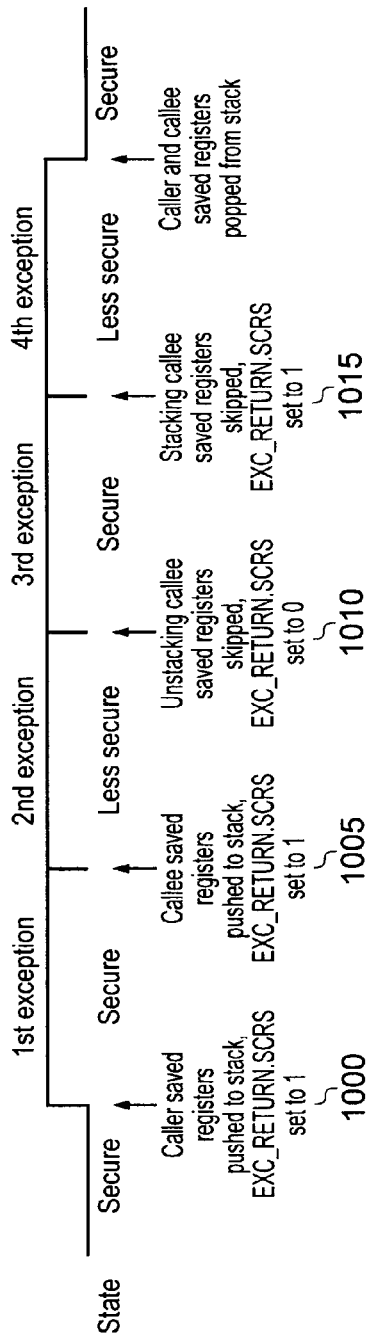

FIGS. 15 and 16 show examples of how unnecessary stack saving and restoring operations shown in FIG. 9 can be avoided using the state saving status value. In FIG. 15 the background processing is in the secure domain when a less secure exception occurs at point 900. As shown in FIG. 12A, the security domain value S is set to 1 to indicate that the background processing was in the secure domain, and the state saving status value SCRS is also set to 1. When the first exception is complete at point 910, there is a pending second exception of equal or lower priority to the first exception and higher priority than the background processing. This exception is tail-chained so that it is processed before going back to background processing. At this point the unstacking of the callee saved registers is skipped. On switching to the second exception, the state saving status value SCRS is set to 0 as shown in step 808 of FIG. 12B, because the background processing was in the secure domain (S=1), the destination is secure and the current process is less secure. Once the second exception has finished processing at point 920, a tail-chained third exception is pending and is to be processed in the less secure domain. Since the state saving status value SCRS equals 0, then according to step 750 of FIG. 11 the additional state saving can be omitted because the callee saved register state has already been saved to the stack. Hence, the third exception can be processed more quickly because there is no delay associated with the additional stacking operations. Finally at point 930 the processing returns to the background and it is determined according to the method of FIG. 13 that the condition at step 820 is satisfied, and so both the callee saved register state and caller saved register state are popped from the stack and restored to the corresponding registers.

FIG. 16 shows another example in which additional stack saving operations can be avoided. In this case, while performing secure background processing, an initial exception to be processed in the secure domain occurs at point 1000. Since the destination is not the less secure domain, according to step 412 of FIG. 6 saving of the callee saved registers will be omitted. Only the caller saved register state is pushed to the stack by hardware at point 1000. The state saving status value is set to 1 as shown in FIG. 12A. At point 1005 a less secure second exception is tail-chained following the first exception. As the state saving status value SCRS equals 1 then at point 1005 the additional state saving is performed according to steps 750 and 755 of FIG. 11, and so the callee saved register state is pushed to the stack. Since S=1 and the destination is less secure, then at step 804 of FIG. 12B the state saving status value is set to 1 for the following exception. At point 1010 a tail-chained transition from the less secure second exception to a secure third exception occurs, and unstacking of the callee saved register is skipped. At this point the state saving status value SCRS is set to 0 according to step 808 of FIG. 12B, because S=1, the destination is secure and the current process is less secure. This means that at the following tail-chained exception at point 1015 stacking of the callee saved registers can be skipped because the value of the state saving status value is 0. As shown in FIG. 16, even if the initial exception is not a transition causing a switch from the secure domain to the less secure domain, the additional state saving performed at a following switch from the secure domain to the less secure domain can be performed once and will not be repeated on subsequent transitions.

It can be seen from FIGS. 15 and 16 that the mechanism for setting the exception return value as shown in FIG. 14 means that when an exception is being processed in the less secure domain, the state saving status value SCRS will always have a value of 1, meanwhile, while when processing a secure exception the state saving status value has a variable value of 0 or 1 to indicate whether additional state saving will be required at the next secure to less secure transition. This is useful because setting the value to a fixed value of 1 while in the less secure domain prevents code in the less secure domain being able to gain any information from the state saving status value which could allow information to be inferred about the past history of exception processing. This improves security.

Also, if less secure code could tamper with the state saving status value, this could influence subsequent state saving operations while in the secure domain, which could lead to a security breach. To prevent this, the processing circuitry can detect, on switching from a less secure exception to a secure exception (e.g. at point 1010 in FIG. 16) that the state saving status value still has the fixed value to which it was set on entering the exception in the less secure domain, and trigger an error if the value has changed. Alternatively, no error could be triggered, but when returning to the secure domain the state saving status value could be reset to the value it is supposed to have in the secure domain, overriding any modification of the state saving status value field by the less secure code.

Figure 17:
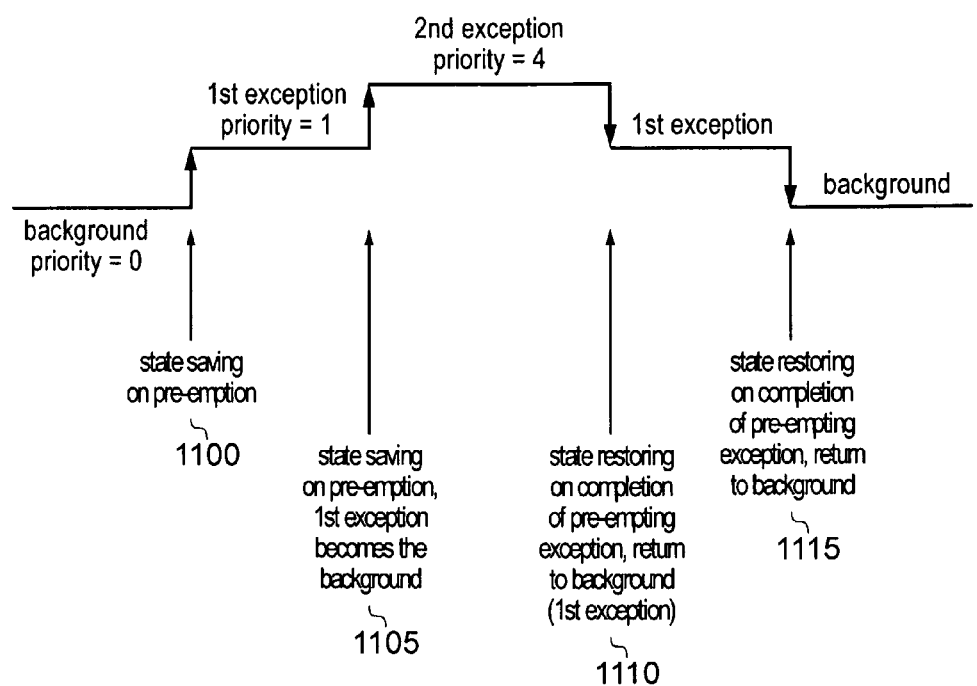
FIG. 17 shows an example of pre-emption of a lower priority exception by a higher priority exception.

FIG. 17 shows an example of pre-emption of exceptions. Each exception may be associated with a priority value. If an exception of a higher priority occurs while an exception of a lower priority is being performed then the high priority exception may pre-empt the lower priority exception and be processed without completing the lower priority exception. While FIG. 17 shows an example in which larger numeric values of the priority value indicate a higher priority, it is also possible to represent higher priorities with lower priority values, e.g. with a priority value of 0 indicating a higher priority exception than a priority value of 1.

As shown in FIG. 17, when a pre-emption occurs, the exception that has been pre-empted can be treated as the background processing for the following exception. For example, at point 1100 of FIG. 17 background processing is interrupted to process a first exception having a priority value of 1. At point 1105 a second exception occurs having a priority value of 4. As this is a higher priority than the current priority level, the second exception pre-empts the first exception and now the first exception is the background processing. When returning from the second exception at point 1110, state restoring will be performed to restore the state that was being used by the background processing (i.e. the first exception) at the time that the second exception occurred. When the first exception completes at point 1115, further state restoring is performed to restore the values used by the original background for processing. Hence, in the earlier embodiments, the "background processing" may itself be processing being performed according to an exception handling routine for an exception which is pre-empted by a higher priority exception.

Figure 18A:
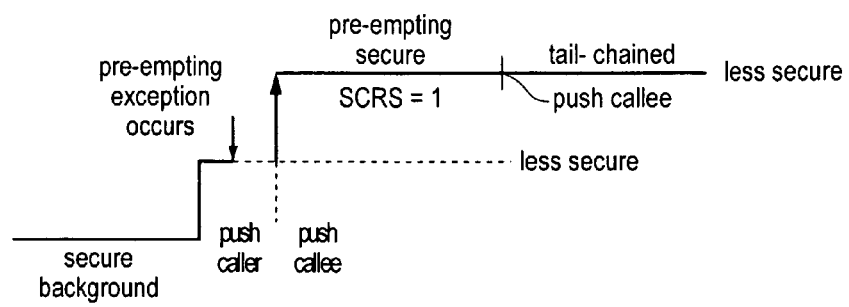
FIGS. 18A and 18B show examples of how state saving can be performed when a pre-emption occurs part way through performing the state saving.
Figure 18B:
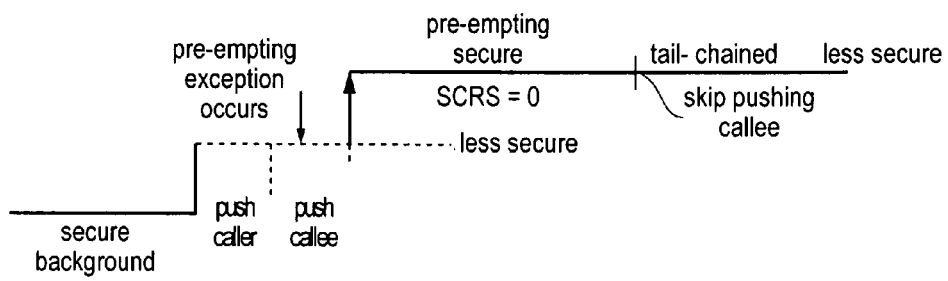

FIGS. 18A and 18B show an example in which the state saving status value can be useful during pre-emption. If the background processing is secure and a less secure exception occurs, then as discussed above both the caller and callee saved registers will be pushed to the stack to prevent access to the callee register state by the less secure exception handler. However, it is possible that another exception of higher priority may occur while this state saving operation is being performed. In this case the higher priority exception will pre-empt the original less secure exception and so the less secure exception will not be processed. If the pre-empting exception is to be processed in the secure domain, it would not be necessary to push the callee saved registers to the stack.

FIG. 18A shows an example where the pre-empting exception occurs while the caller saved registers are being pushed to the stack. In this case, since the pre-empting exception is secure, it is not necessary to perform additional state saving of the callee registers and so once stacking of the caller registers is complete then processing of the secure exception can begin. This avoids a delay caused by pushing the callee register state to the stack. If a subsequent tail-chained less secure exception occurs then as shown in FIG. 18A the callee register state can be pushed to the stack at this point.

On the other hand, FIG. 18B shows an example where the pre-empting exception in the secure domain occurs while the callee registers are being pushed to the stack ready for processing of the original less secure exception. In this case, it can be more efficient to continue pushing the callee registers and to switch to the secure exception when state saving of the callee registers is complete. This is because halting the state saving of the callee registers, and reversing the stacking operations of the callee registers that have already completed, could take longer than simply finishing the state saving. Hence, there will be less of a delay if state saving is completed. The state saving status value SCRS can be set to 0 if the saving of the callee register is completed, to indicate that the additional state saving has already taken place so that it can be skipped when a further less secure tail-chained exception occurs. Hence, the state saving status value also enables a performance improvement when handling pre-emption.

The subject matter of the present application is related to subject matter discussed in commonly assigned co-pending U.S. application Ser. No. 13/368,419 and UK patent application number 1217531.1, and the entire contents of both of these documents are hereby incorporated by reference.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. A data processing apparatus comprising:
   processing circuitry for performing data processing operations in response to program code, the processing circuitry comprising exception control circuitry for controlling exception processing;
   a plurality of registers for storing data, the registers including a first subset of registers and a second subset of registers; and
   a data store for storing data, the data store comprising a plurality of regions including a secure region and a less secure region, wherein the secure region is for storing data which is accessible by the processing circuitry when operating in a secure domain and not accessible by the processing circuitry when operating in a less secure domain; wherein:
   in response to an initial exception from background processing performed by the processing circuitry, the exception control circuitry is configured to perform state saving of data from the first subset of registers before triggering the processing circuitry to perform an exception handling routine corresponding to the exception, wherein the exception handling routine has responsibility for performing state saving of data from the second subset of registers;
   in response to a first exception causing a transition from the secure domain to the less secure domain, where the background processing was performed by the processing circuitry in the secure domain, the exception control circuitry is configured to perform additional state saving of the data from the second subset of registers before triggering the processing circuitry to perform the exception handling routine in the less secure domain; and
   in response to a tail-chained exception causing a transition from the secure domain to the less secure domain, the exception control circuitry is configured to trigger the processing circuitry to perform the exception handling routine without performing the additional state saving, the tail-chained exception being processed after said first exception has been processed and before returning to the background processing,
   wherein on entry to a new exception causing a transition from the secure domain to the less secure domain, the exception control circuitry is configured to determine, in dependence on a state saving status value, whether to perform the additional state saving before triggering the exception handling routine, and
   wherein the state saving status value indicates whether at least one exception has been processed in the less secure domain between halting the background processing and entering the new exception.

2. The data processing apparatus according to claim 1, wherein in response to said first exception, the exception control circuitry is configured to clear the first subset of registers and the second subset of registers before triggering the processing circuitry to perform the exception handling routine.

3. The data processing apparatus according to claim 1, wherein if the exception control circuitry has performed the additional state saving before triggering the processing circuitry to perform the exception handling routine, then the exception handling routine does not perform the state saving of the second subset of registers.

4. The data processing apparatus according to claim 1, wherein if the exception control circuitry has performed the additional state saving before triggering the processing circuitry to perform the exception handling routine, then the exception handling routine also performs state saving of the second subset of registers.

5. The data processing apparatus according to claim 1, wherein said first exception comprises the initial exception.

6. The data processing apparatus according to claim 1, wherein said first exception comprises a tail-chained exception processed after the initial exception has been processed and before returning to the background processing.

7. The data processing apparatus according to claim 1, wherein in response to a tail-chained exception causing a transition from the less secure domain to the secure domain, the exception control circuitry is configured to control the processing circuitry to trigger the exception handling routine without restoring the data saved in the additional state saving to the second subset of registers.

8. The data processing apparatus according to claim 1, wherein the state saving status value indicates whether the additional state saving needs to be performed before processing a tail-chained exception in the less secure domain.

9. The data processing apparatus according to claim 1, wherein on entry to the new exception, the exception control circuitry is configured to perform the additional state saving if:
   (a) the background processing was performed in the secure domain;
   AND
   (b) the state saving status value indicates that no exceptions have been processed in the less secure domain between halting the background processing and entering the new exception.

10. The data processing apparatus according to claim 9, wherein the exception control circuitry is configured to set a security domain value indicating whether the background processing was performed in the secure domain or the less secure domain.

11. The data processing apparatus according to claim 1, wherein the exception control circuitry is configured to set the state saving status value to a fixed value
   when entering the less secure domain, and to set the state saving status value to a variable value
   when entering the secure domain.

12. The data processing apparatus according to claim 11, wherein when returning from an exception in the less secure domain, the exception control circuitry is configured to check whether the state saving status value still has the fixed value, and to trigger an error if the state saving status value does not have the fixed value.

13. The data processing apparatus according to claim 1, wherein the state saving status value has a variable value; and
when returning from an exception in the less secure domain, the exception control circuitry is configured to control exception processing independently of the state saving status value.

14. The data processing apparatus according to claim 1, wherein the state saving status value indicates whether the most recent transition between the domains when switching between tail-chained exceptions was from the less secure domain to the secure domain.

15. The data processing apparatus according to claim 1, wherein the registers include a link register for storing an exception return value for controlling return from the exception handling routine.

16. The data processing apparatus according to claim 15, wherein:
on entry to an exception, the exception control circuitry is configured to set the link register to a dummy exception return address which does not correspond to a valid instruction address;
the exception handling routine includes a branch to the address that was set in the link register; and
in response to the branch to the dummy exception return address indicated in the link register, the exception control circuitry is configured to perform state restoring processing for restoring the data saved in the state saving, before causing the processing circuitry to return to background processing.

17. The data processing apparatus according to claim 16, wherein the state saving status value is indicated in part of the dummy exception return address.

18. The data processing apparatus according to claim 1, wherein if a pre-empting exception having a higher priority than said first exception occurs while performing the additional state saving of the second subset of registers, the exception control circuitry is configured to complete the additional state saving before triggering the processing circuitry to process the exception handling routine of the pre-empting exception.

19. The data processing apparatus according to claim 18, wherein on completing the additional state saving, the exception control circuitry is configured to set a state saving status value to indicate that the additional state saving has been performed.

20. The data processing apparatus according to claim 19, wherein in response to a tail-chained exception causing a transition from the secure domain to the less secure domain which is performed after the pre-empting exception, the exception control circuitry is configured to trigger the processing circuitry to perform the exception handling routine without performing the additional state saving if the state saving status value indicates that the additional state saving has previously been performed.

21. The data processing apparatus according to claim 1, wherein the data store comprises a plurality of stacks including a secure stack and a less secure stack.

22. The data processing apparatus according to claim 21, wherein in the state saving of the first subset of registers and the additional state saving of the second subset of registers, the exception control circuitry is configured to save the data to the one of the secure stack and the less secure stack corresponding to the current domain in which the processing circuitry was operating when the initial exception occurs while performing the background processing.

23. A data processing apparatus comprising:
processing means for performing data processing operations in response to program code, the processing means comprising exception control means for controlling exception processing;
a plurality of register means for storing data, the register means including a first subset of register means and a second subset of register means; and
data storing means for storing data, the data storing means comprising a plurality of regions including a secure region and a less secure region, wherein the secure region is for storing data which is accessible by the processing means when operating in a secure domain and not accessible by the processing means when operating in a less secure domain; wherein:
in response to an initial exception from background processing performed by the processing means, the exception control means is configured to perform state saving of data from the first subset of register means before triggering the processing means to perform an exception handling routine corresponding to the exception, wherein the exception handling routine has responsibility for performing state saving of data from the second subset of register means;
in response to a first exception causing a transition from the secure domain to the less secure domain, where the background processing was performed by the processing means in the secure domain, the exception control means is configured to perform additional state saving of the data from the second subset of register means before triggering the processing means to perform the exception handling routine in the less secure domain; and
in response to a tail-chained exception causing a transition from the secure domain to the less secure domain, the exception control means is configured to trigger the processing means to perform the exception handling routine without performing the additional state saving, the tail-chained exception being processed after said first exception has been processed and before returning to the background processing,
wherein on entry to a new exception causing a transition from the secure domain to the less secure domain, the exception control means is configured to determine, in dependence on a state saving status value, whether to perform the additional state saving before triggering the exception handling routine, and
wherein the state saving status value indicates whether at least one exception has been processed in the less secure domain between halting the background processing and entering the new exception.

24. A data processing method for a data processing apparatus comprising processing circuitry for performing data processing operations in response to program code, the processing circuitry comprising exception control circuitry for controlling exception processing; a plurality of registers for storing data, the registers including a first subset of registers and a second subset of registers; and a data store for storing data, the data store comprising a plurality of regions including a secure region and a less secure region, wherein the secure region is for storing data which is accessible by the processing circuitry when operating in a secure domain and not accessible by the processing circuitry when operating in a less secure domain;

the method comprising the steps of:

in response to an initial exception from background processing performed by the processing circuitry, the exception control circuitry performing state saving of data from the first subset of registers before triggering the processing circuitry to perform an exception handling routine corresponding to the exception, wherein the exception handling routine has responsibility for performing state saving of data from the second subset of registers;

in response to a first exception causing a transition from the secure domain to the less secure domain, where the background processing was performed by the processing circuitry in the secure domain, the exception control circuitry performing additional state saving of the data from the second subset of registers before triggering the processing circuitry to perform the exception handling routine in the less secure domain; and in response to a tail-chained exception causing a transition from the secure domain to the less secure domain, the exception control circuitry triggering the processing circuitry to perform the exception handling routine without performing the additional state saving, the tail-chained exception being processed after said first exception has been processed and before returning to the background processing, wherein on entry to a new exception causing a transition from the secure domain to the less secure domain, the exception control means is configured to determine, in dependence on a state saving status value, whether to perform the additional state saving before triggering the exception handling routine, and wherein the state saving status value indicates whether at least one exception has been processed in the less secure domain between halting the background processing and entering the new exception.

* * * * *